US009299222B2

United States Patent
Hoyt et al.

(10) Patent No.: US 9,299,222 B2
(45) Date of Patent: Mar. 29, 2016

(54) REAL-TIME TRACKING OF LOCATIONS OF MACHINE-READABLE PAI GOW GAMING TILES

(71) Applicant: Fortiss, LLC, Los Angeles, CA (US)

(72) Inventors: Joshua K. Hoyt, Portland, OR (US); Forrest S. Seitz, Beaverton, OR (US); Eduard Vaynberg, Portland, OR (US)

(73) Assignee: Fortis, LLC, Los Angeles, CA (US)

( * ) Notice: Subject to any disclaimer, the term of this patent is extended or adjusted under 35 U.S.C. 154(b) by 8 days.

(21) Appl. No.: 14/348,235

(22) PCT Filed: Sep. 28, 2012

(86) PCT No.: PCT/US2012/058048
§ 371 (c)(1),
(2) Date: Mar. 28, 2014

(87) PCT Pub. No.: WO2013/049664
PCT Pub. Date: Apr. 4, 2013

(65) Prior Publication Data
US 2014/0235308 A1    Aug. 21, 2014

Related U.S. Application Data

(60) Provisional application No. 61/541,845, filed on Sep. 30, 2011.

(51) Int. Cl.
*G07F 17/32* (2006.01)
*A63F 9/20* (2006.01)
*A63F 3/00* (2006.01)
*A63F 9/24* (2006.01)

(52) U.S. Cl.
CPC ........ *G07F 17/3293* (2013.01); *A63F 3/00157* (2013.01); *A63F 9/20* (2013.01); *G07F 17/322* (2013.01); *G07F 17/3241* (2013.01); *A63F 2003/00716* (2013.01); *A63F 2009/2489* (2013.01); *A63F 2250/58* (2013.01)

(58) Field of Classification Search
USPC ................................. 463/11, 12, 13
See application file for complete search history.

(56) References Cited

U.S. PATENT DOCUMENTS

| 5,831,527 | A | 11/1998 | Jones II, et al. |
| 2006/0205484 | A1 | 9/2006 | Nicastro |
| 2006/0247036 | A1 | 11/2006 | Shigeta |
| 2009/0143141 | A1* | 6/2009 | Wells ...................... G07F 17/32 463/37 |
| 2009/0325686 | A1* | 12/2009 | Davis ...................... G07F 17/32 463/25 |

FOREIGN PATENT DOCUMENTS

JP    2005-342175    12/2005

OTHER PUBLICATIONS

International Search Report and Written Opinion issued Jan. 30, 2013 in International Application No. PCT/US2012/058048.

* cited by examiner

*Primary Examiner* — Pierre E Elisca
(74) *Attorney, Agent, or Firm* — Stoel Rives LLP

(57) ABSTRACT

A preferred embodiment of a Pai Gow gaming table (352) is equipped with a system (460) that implements real-time tracking of gaming tiles (366) to mitigate risk of dealer or player cheating behavior during game play. Each gaming tile has a machine-readable tile identifying tag. The gaming table has a playing surface (350) that includes a pre-assigned woodpile position (358) and multiple pre-assigned player positions (54). Multiple woodpile position tile tag identification readers (362) configured to read the tile identifying tags are located in the pre-assigned woodpile position. Multiple player position tile tag identification readers (360) operatively associated with different ones of the pre-assigned player positions and configured to read the tile identifying tags are located in associated ones of the pre-assigned player positions. A controller (68, 464) operatively associated with the tile tag identification readers performs during game play real-time tracking of movement of the gaming tiles.

15 Claims, 25 Drawing Sheets

Section A-A

Section B-B

REAL-TIME TRACKING OF LOCATIONS OF MACHINE-READABLE PAI GOW GAMING TILES

COPYRIGHT NOTICE

© 2012 Fortiss LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The present disclosure relates to managing risk of gaming establishments in high-stakes Pai Gow game play and, in particular, to implementing machine-readable identification, preferably radio frequency identification (RFID), capability to Pai Gow tiles to track their locations in real time and thereby mitigate risk of dealer or player cheating behavior during game play.

BACKGROUND INFORMATION

Pai Gow is a gambling game played using a set of 32 Chinese domino-like tiles. The tiles are turned face down on a gaming table and randomized by a dealer before they are assembled into a monolithic brick known as a "woodpile." The woodpile consists of eight adjacent stacks of four tiles each. This woodpile is then "shuffled" in one of a number of scripted rituals that result in a new woodpile before dealing the tiles to players. Bets are made, dice are rolled to further randomize tile distribution, and four tiles are dealt to each player in accordance with one of several defined methods. At this point each player groups his four tiles into a "high" (HI) hand and a "low" (LO) hand. A complex set of rules—including special "power tiles"—defines the value of each hand. The player's goal is to beat both the dealer's high and low hands. Player strategy lies in choosing the best way to pair the four tiles dealt to each player.

FIG. 1 is a flow diagram showing the basic functions 10 required in the play of a hand of a typical Pai Gow game. Playing a hand of Pai Gow entails several shuffle mode steps followed by several play mode steps. The shuffle mode steps include a step 12 of the dealer randomizing the tiles face down; a step 14 of players placing bets; steps 16, 18, and 20 of the dealer, respectively, building an initial woodpile of eight four-tile stacks, shuffling the tiles, and constructing a "post-shuffle (final) woodpile"; and a step 22 of the dealer rolling dice to determine the order in which different ones of the stacks in the woodpile are distributed to the players. A player position denominated the "bank" is the nominal starting location for a deal. The value produced by the dice roll determines an incremental shift from the bank position and thereby establishes the player position from which dealing of the four-tile stacks starts. This starting position is defined as the "action." The play mode steps include a step 24 of the dealer dealing the tiles; a step 26 of dealer and players forming their HI and LO hands with the tiles face down; a step 28 of the dealer and players exposing their hands; and step 30 of the dealer determining the winners and losers, and collecting and paying out the bets.

Casino margins are typically 1%, and the game is ripe for player/player and player/dealer collusion that can work against the house. Examples of such collusion during game play are dealers steering, by shuffling or illegal deals, "power tiles" to specific players; players substituting tiles; and players exchanging tiles. Actual game play is chaotic, with players free to remove some or all of their tiles while they form their hands. This gaming environment complicates the process of tracking the tiles and ensuring integrity of game play.

SUMMARY OF THE DISCLOSURE

Pai Gow is a traditional high-stakes Chinese game played with a set of tiles that are similar to dominoes. Because casino margins are typically 1%, player-to-player and player-to-dealer collusion can quickly stack the odds against the house. Mischief can include attempts to mark specific high-value tiles, sleight-of-hand shuffles, and player-to-player exchanges. Use of machine-readable, preferably RFID-enabled, gaming tiles to track their locations during game play mitigates these issues.

A preferred methodology implements strategies carried out within a hand during game play and over multiple hands of game play. The strategy within the hand entails ensuring that the tiles played match the corresponding stacks of tiles in the "woodpile." The strategy over multiple hands entails ensuring that the statistical distribution of "power tiles" does not favor one or more players. This information can be used by the casino to identify cheating behavior and to trigger changing out of the tiles. Changing tiles is currently performed at significant expense every ten hours with no basis for change.

A preferred system using RFID-enabled gaming tiles is integrated into a Pai Gow gaming table and is able to log important performance parameters. The preferred system disclosed addresses the following questions: can the system automatically identify the start and end of each game; can the system correctly identify the tiles in each stack of the "woodpile"; can the system automatically detect illegal deals; can the system identify the tiles dealt to each player and track them throughout a game; can the system identify swapped or missing tiles; and can alarms correctly trigger e-mail messages to key casino personnel?

Alarms generated by the system can be classified into a customizable hierarchy so that low-risk scenarios need not stop play while high-risk scenarios can be addressed quickly by security personnel.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
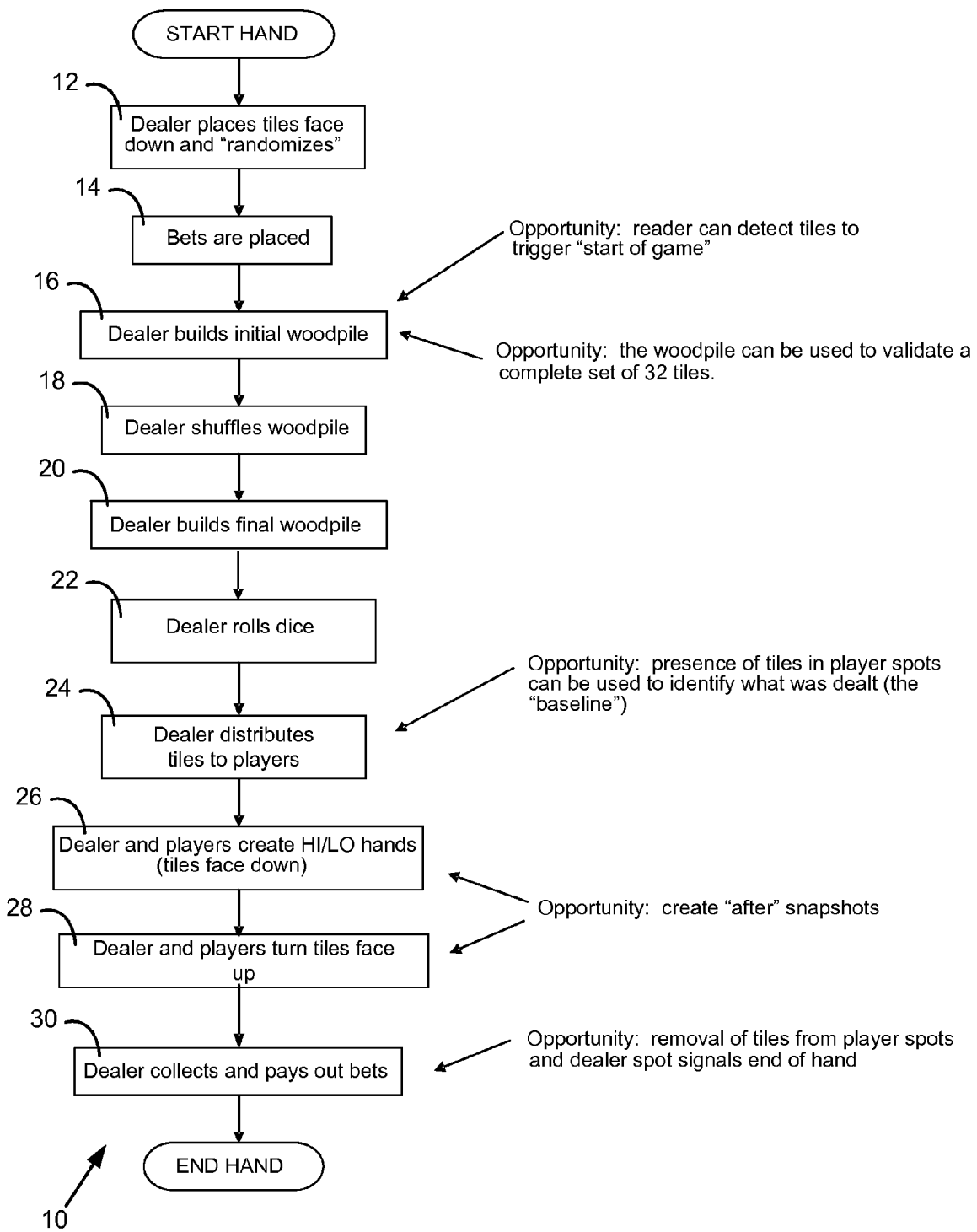
FIG. 1 is a flow diagram showing the basic functions required in the play of a hand of a typical Pai Gow game and annotated to indicate opportunities for game play tracking in accordance with disclosure.
Figure 2:
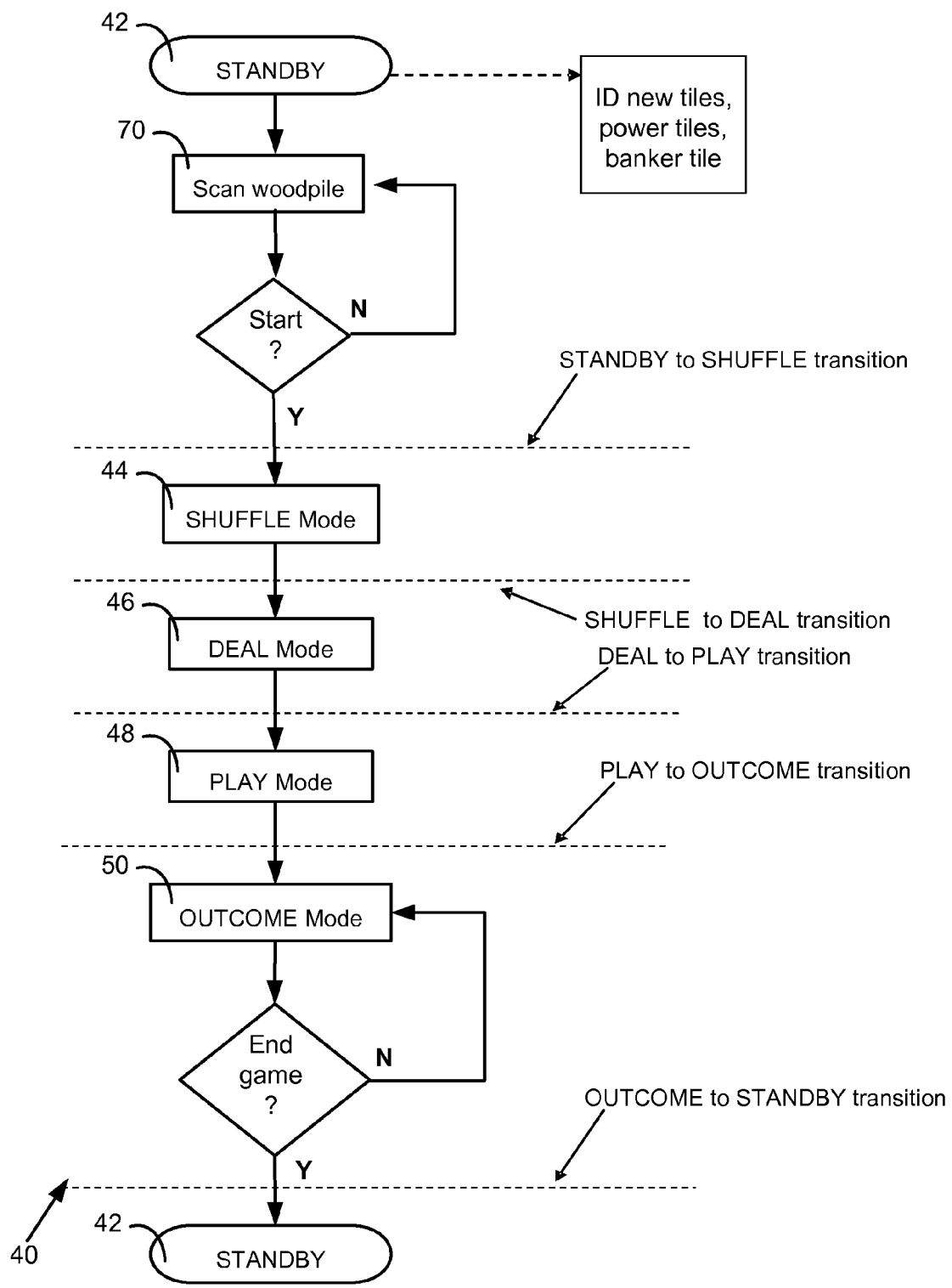
FIG. 2 is a flow diagram of the five modes of game play operation of Pai Gow.

Observation of game play presented in the game flow diagram of FIG. 1 reveals five modes of game play operation 40, which are identified in the flow diagram of FIG. 2. (Annotations made on FIG. 1 indicate opportunities for game play tracking performed in accordance with the methodology described below.) With reference to FIG. 2, a standby mode 42, which is the default mode, entails waiting for a game to start and is characterized by a capability of identifying an introduction of new tiles, power tiles, and bank tiles. A shuffle mode 44 entails identifying the start of a game, identifying the location of the "bank," validating the set of 32 tiles introduced, grouping the 32 tiles into eight "post-shuffle" stacks of four tiles each, and defining the "action." As stated earlier, the action is the player position or spot where the dealer deals the first tiles. A deal mode 46 entails identifying which stacks of four tiles were dealt to each player and ensuring a legal deal (stacks dealt in sequence, either left-to-right (L/R) or right-to-left (R/L)). A play mode 48 entails monitoring player actions and ensuring that each active player is using only the assigned tiles. An outcome mode 50 entails identifying the active players and identifying the end of a game. Each of these modes is described in greater detail below.

FIG. 2 identifies event triggers that drive the transition from one mode to its next succeeding mode in game play operation 40. A standby-to-shuffle transition from standby mode 42 to shuffle mode 44 indicates the start of a new game and is triggered by the presence of more than 16 tiles in the woodpile. A shuffle-to-deal transition between shuffle mode 44 and deal mode 46 indicates successful (or unsuccessful) identification of the complete set of 32 tiles in eight stacks of four tiles each and is triggered by reading a tile in any player spot. A deal-to-play transition from deal mode 46 to play mode 48 indicates successful (or unsuccessful) identification of eight sets of four tiles—one set for each player—the instant that the tiles are dealt and is triggered by reading eight sets of four tiles each during a timeout interval. A play-to-outcome transition from play mode 48 to outcome mode 50 indicates the point in time when the dealer reveals his hand and is triggered by the dealer moving his four tiles from a "face down" spot to a "face up" spot on the gaming table. An outcome-to-standby transition from outcome mode 50 to standby mode 42 indicates the end of a game and is triggered by removal of all tiles from the player spots and removal of four tiles from the dealer "face up" spot.

Tracking of the locations of the player tiles entails tracing them back to specific locations in the woodpile and then checking that these locations are sequential—either left-to-right or right-to-left. A system application program flags any inconsistency as an illegal deal. This program architecture sidesteps a need to know the dice roll indicated in step 22 of FIG. 1. To maximize the robustness of the program architecture, the system reads player spots every 200 milliseconds during deal mode 46.

Figure 3:
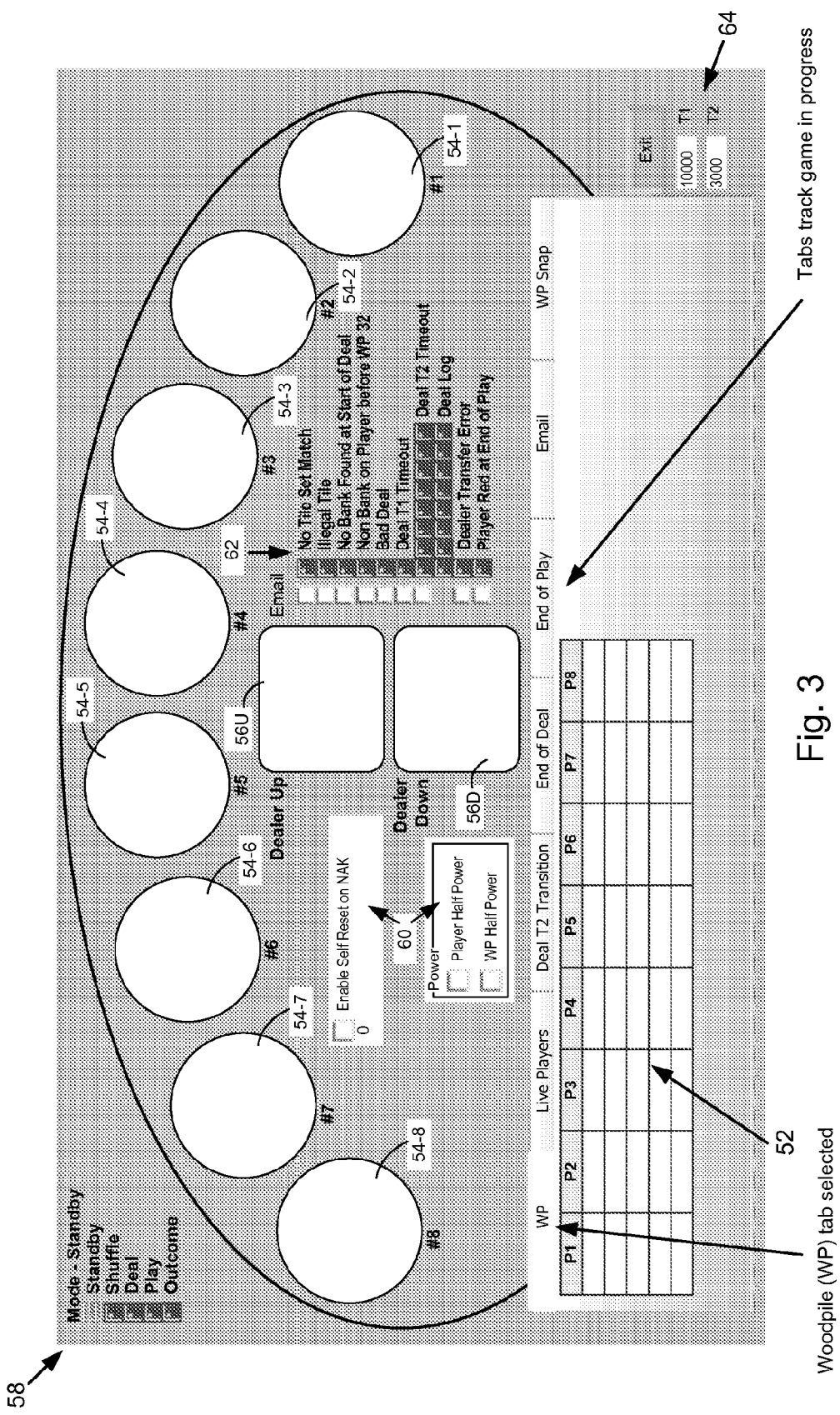
FIG. 3 is a basic display screen-shot of game play information presented on a visual layout resembling the playing surface of a Pai Gow gaming table with the dealer and player positions marked on it.

FIG. 3 shows the basic display screen-shot produced by the system application program for display to casino management. Game play information is presented at designated locations on a visual layout resembling the playing surface of a Pai Gow gaming table. The following color chart shows linings designating the colors to which the descriptions below refer and which are represented in the screen-shots of FIGS. 3, 6, 11, 13, and 15.

Green 
Red 
Yellow 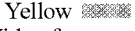

With reference to FIG. 3, a set of tab-actuated display screens appears across the bottom of the gaming table rendering. A woodpile 52 depicted in grid form appears in response to operator selection of the WP tab of seven available tabs that track the game in progress. Woodpile 52, which is composed of 32 tiles in eight stacks of four tiles each, is depicted as eight columns identified by players P1, P2, P3, P4, P5, P6 P7, and P8 (collectively,P columns) that represent the woodpile stacks of four tiles assigned to the respective player positions or spots 54-8, 54-7, 54-6, 54-5, 54-4, 54-3, 54-2, and 54-1 (collectively, player spots 54). The RFID numbers of the four tiles assigned to each of player spots 54 appear in four rows or cells of the corresponding one of the P columns. Two dealer spots 56D and 56U, of which spot 56D receives placement of "face down" dealer tiles and spot 56U receives placement of "face up" dealer tiles, appear in the center of the gaming table rendering.

A mode indicator 58 in the upper left-hand corner of the gaming table rendering is composed of a vertical column of five squares representing different ones of the five modes of game play operation 40. By way of example, the square representing the standby mode of operation is shown illuminated in red and identified by text as a heading for the column. Controls 60 for reset and identification of tiles (set of 32 tiles, power tiles, and bank tile) appear as windows to the left of dealer spots 56D and 56U. A set of alarm indicators 62 is composed of a vertical column of ten alarm positions, eight of which each including a single square and two of which each including eight squares arranged in a row. Alarm indicators 62 include, from top to bottom, no Tile Set Match, Illegal Tile, No Bank Found at Start of Deal, Non-Bank on Player before WP32, Bad Deal, Deal T1 Timeout, Deal T2 Timeout, Deal Log, Dealer Transfer Error, Player Red at End of Play. These squares can be illuminated in red (warning) or green (no warning), or be dark in a steady state operating condition. Each of warning indicators 62 (except Deal Log) has an associated e-mailbox an operator can, in accordance with preassigned priorities, deselect to prevent sending of a warning notification to casino management. Timeouts windows 64 appear in the bottom right-hand corner of the gaming table rendering and indicate the preassigned time interval durations for T1 and T2 timeouts.

Figure 24:
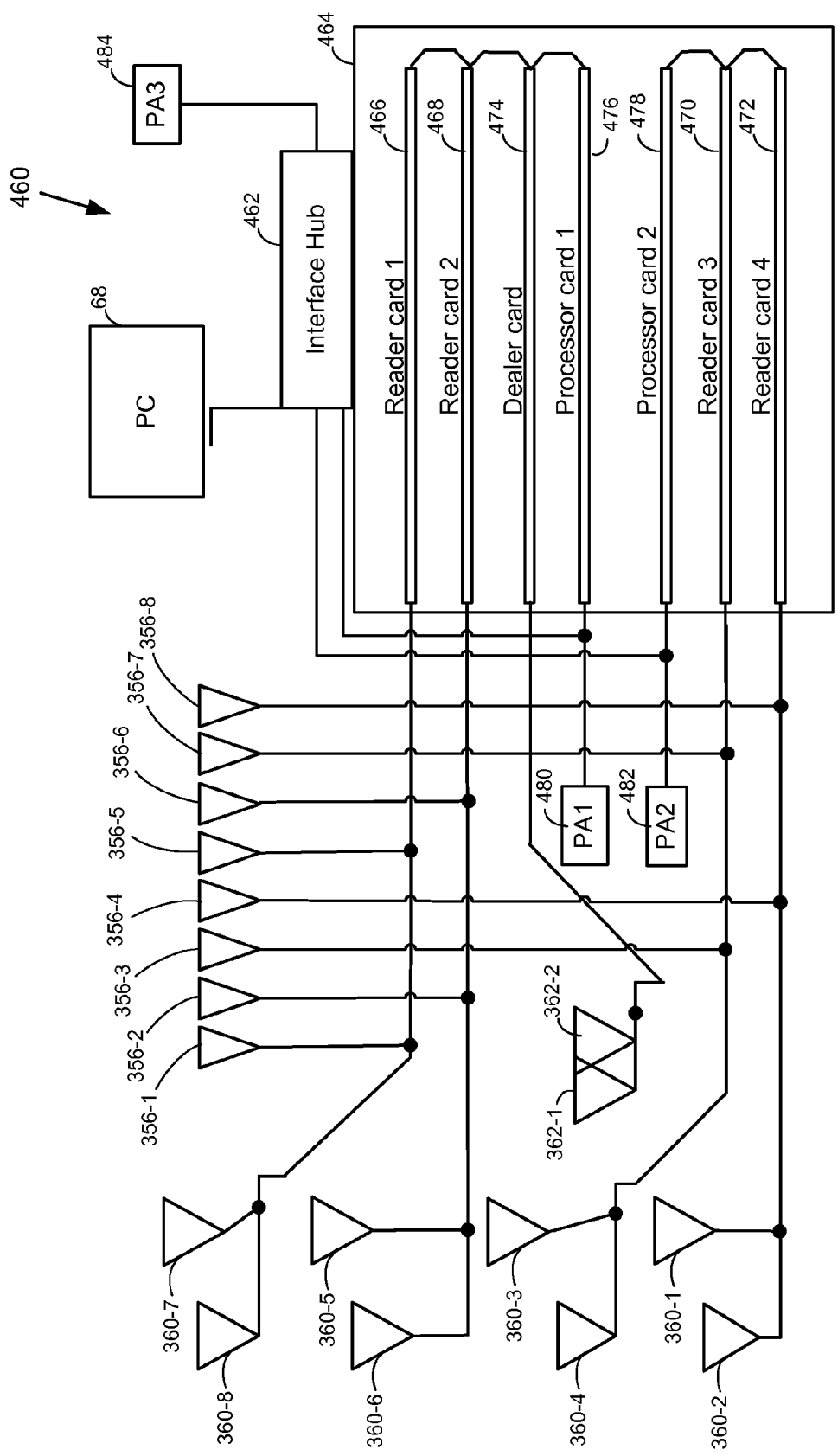
FIG. 24 is a block diagram showing the electronic architecture of a tile reader control and game play monitoring system in which the operations of the system application program are performed.

The following text, flow diagrams, and screen shots presented describe in greater detail each of the five modes of game play operation 40 outlined in FIG. 2. The flow diagrams of functions performed and screen shots of display information presented in each of the five modes are enabled by operation of the system application program, which resides in a personal computer (PC) 68 (FIG. 24).

Figure 4:
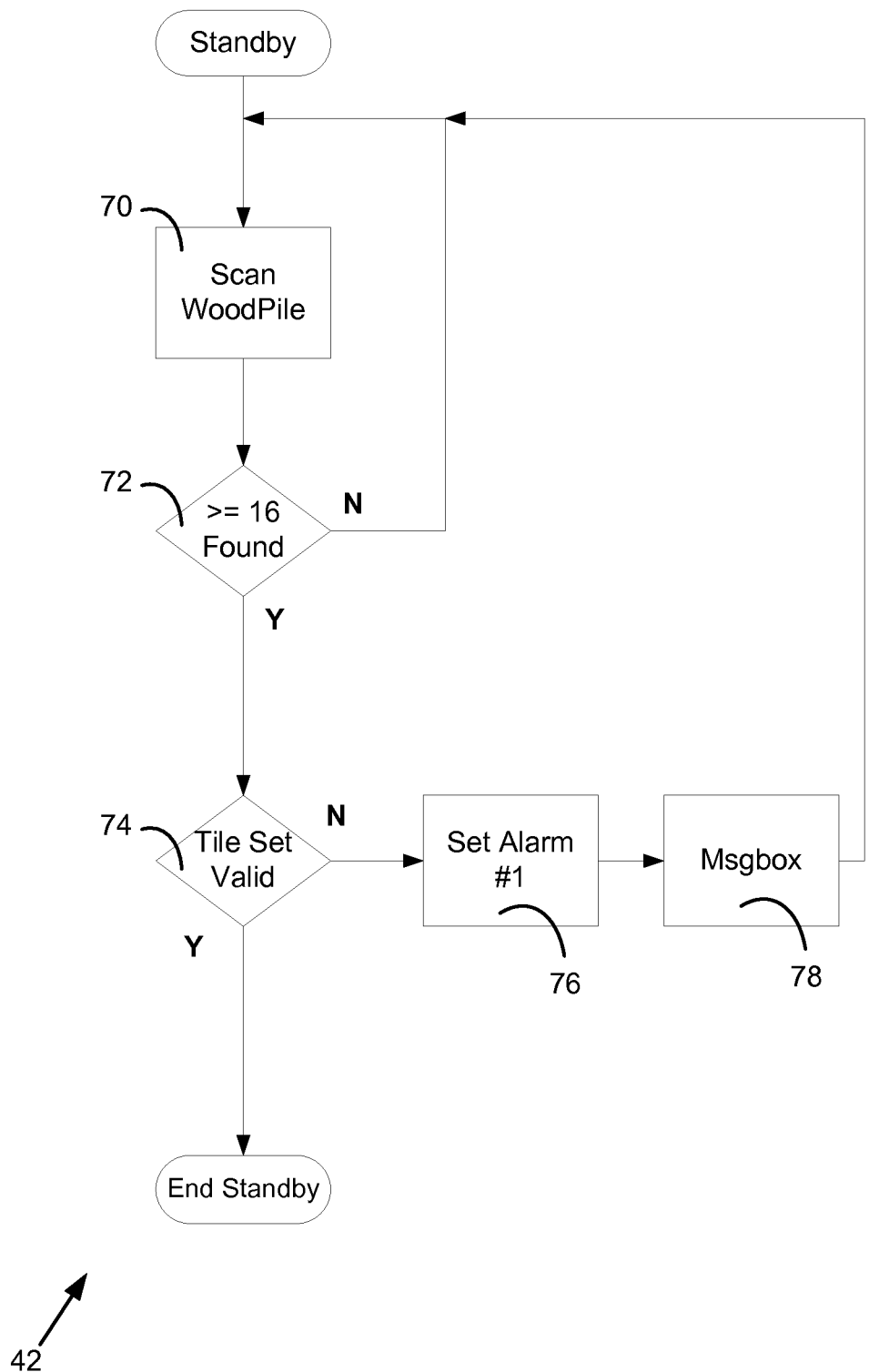
FIG. 4 is a flow diagram of a standby mode of operation performed by the system applications program.

FIG. 4 is a detailed flow diagram of standby mode 42 performed by the system applications program. With reference to FIG. 4, upon startup, the system is initialized to standby mode 42. In standby mode 42, the system performs a scan operation 70 on woodpile 52 to detect the number of and identify the RFID-enabled gaming tiles. The system simply can display what is seen by antenna/readers positioned under the gaming table surface at player spots 54, but there is no information of value until at least 16 tiles are detected by woodpile scan operation 70—indicating the start of a new game. The 16 tiles value is an arbitrary threshold indicated by a decision block 72. A determination of an invalid set of tiles, as indicated by a decision block 74, generates an Alarm No. 1, as indicated by process block 76; causes transmission of an Alarm No. 1 indication message to a system message box 78; and causes the system to perform again woodpile scan operation 70.

New sets of tiles can be introduced while the system is in standby mode 42. In one implementation, bank tiles and complete sets of 3 game tiles are defined in the system application program—limiting monitoring to a single gaming table. In an alternative implementation in which "back office" connectivity is in place, the tile database can be shared with multiple gaming tables.

A determination of a valid set of tiles, i.e., more than 16 tiles are detected on woodpile 52, as indicated by decision block 74 of FIG. 4, causes the system to transition from standby mode 42 to shuffle mode 44.

Figure 5:
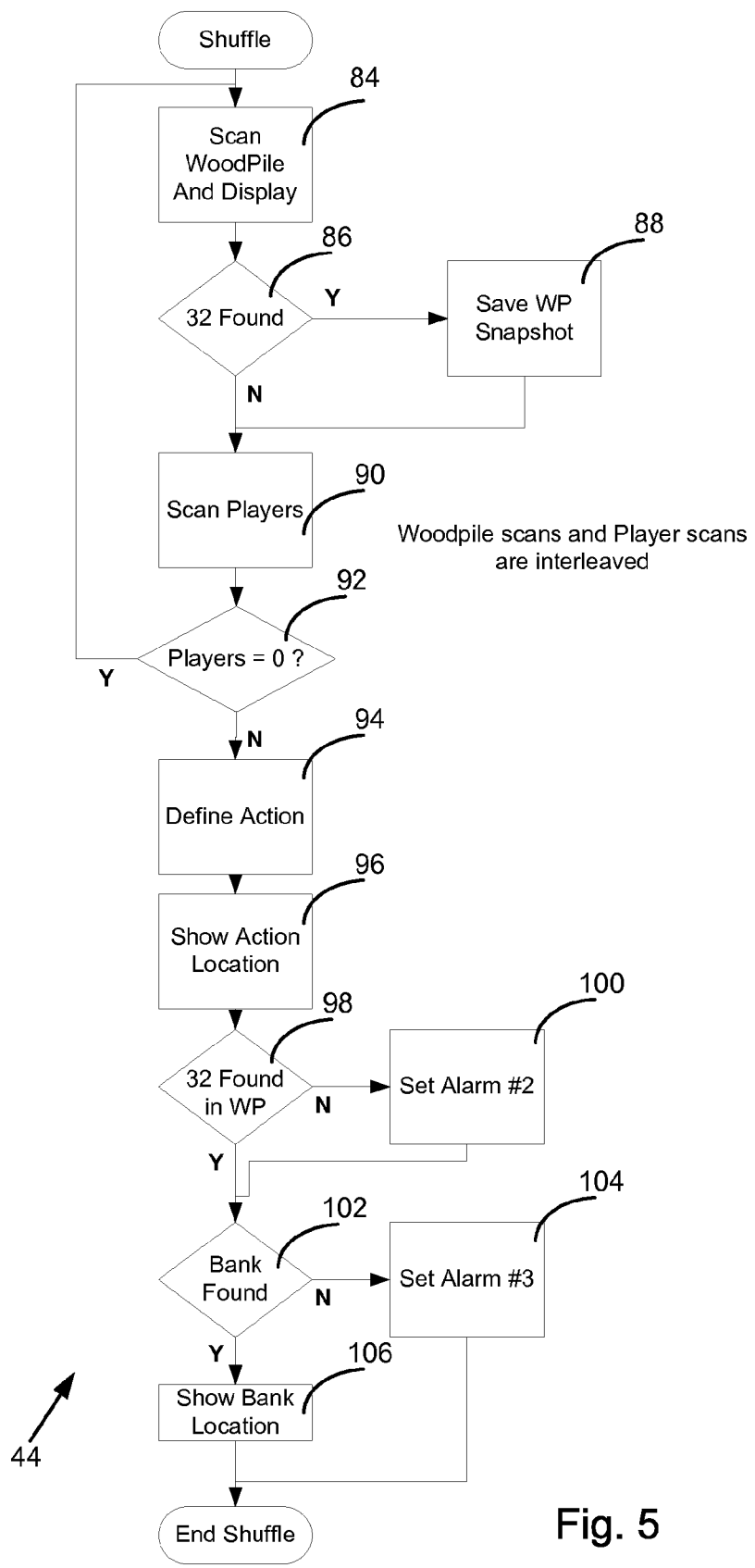
FIG. 5 is a flow diagram of a shuffle mode of operation performed by the system applications program.

FIG. 5 is a detailed flow diagram of shuffle mode 44, which has four primary goals that include validating the set of 3 tiles, grouping the 32 tiles into eight "post-shuffle" stacks of four tiles each, defining an "action" event, and identifying the location of the bank tile. In normal operation, the system correctly detects the location of the bank tile and all 3 tiles in the woodpile.

With reference to FIG. 5, once an initial woodpile is built, the dealer performs a series of ritualistic shuffles. The system performs woodpile scan and display operations 84 until 32 tiles are identified. As indicated by decision block 86, the system saves as a woodpile snapshot 88 a record of the 32 tiles and their locations in the woodpile. The system also performs a scan operation 90 on player spots 54 and continues to update and save woodpile snapshots 88 throughout these dealer actions up until a time when a tile is detected on any one of player spots 54. FIG. 5 shows that woodpile scan and display operations 84 and woodpile snapshot 88 scans are interleaved. A decision block 92 indicates that detecting a tile on any player spot defines the action event and the one of player spots 54 where the first tiles are dealt, and triggers completion of shuffle mode 44 and the start of deal mode 46. The "action" defines a "post-shuffle woodpile snapshot" 88, which is used to track the assignment of the stacks of four tiles dealt to each of player positions 54. This information creates baseline data against which all subsequent data are compared. Process blocks 94 and 96 show, respectively, defining the "action" and display of its player spot location.

For the case in which the system is unable to read all 32 tiles (e.g., misalignment of tiles relative to a woodpile antenna positioned under the gaming table surface at a designated spot where woodpile 52 is formed or the introduction of a non-RFID-enabled tile), only tiles correctly read by the system are used going forward and missing tiles are noted in logged data of the system application program. The presence of tiles in player spots 54 after the start of a new game (greater than 16 tiles on the woodpile) but without a complete set of 32 tiles in the woodpile means that a "bad" tile is in play, as indicated by decision block 98. A corresponding Alarm No. 2 is logged and displayed, as indicated by process block 100, but game play can continue using the degraded data. Casino management can decide whether to act immediately on Alarm No. 2 or relegate it to review at a later time.

For the case in which the system is unable to read the bank tile, as indicated by decision block 102, a corresponding Alarm No. 3 is logged and displayed and game play can continue, as indicated by process block 104. Again, casino management has the option to act immediately on Alarm No. 3 or relegate it for review. When the bank tile is successfully read, its location is displayed in the grid in the one of player spots 54 corresponding to the player functioning as the bank, as indicated by process block 106 and FIG. 11 below.

Figure 6:
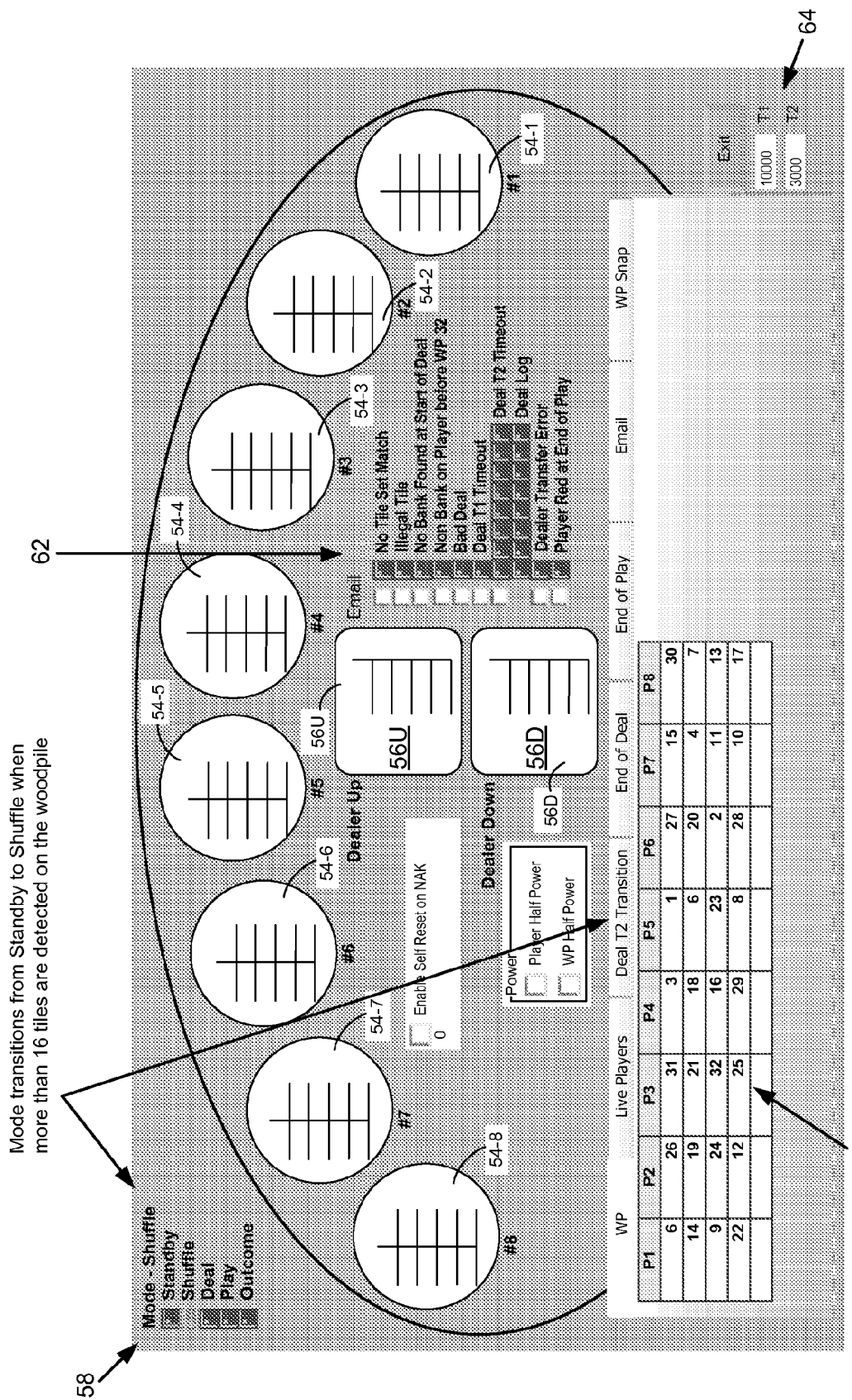
FIG. 6 is a display screen-shot of game play information arranged as shown in FIG. 3 but presented for the shuffle mode at the start of a game.

FIG. 6 is an example screen-shot in shuffle mode 44 of game play information at the start of a game. FIG. 6 is a version of the gaming table visual layout of FIG. 3 but shows several locations populated with information obtained in shuffle mode 44. FIG. 6 shows mode indicator 58 with a "shuffle" square illuminated in red and a "Mode-Shuffle" column heading, the eight player spots 54 and dealer spots 58D and 58U with unpopulated grid lines, and woodpile 52 grid populated with tile RFID numbers in four cells in each of the eight P columns.

The primary goals of deal mode 46 include identifying which tiles are dealt to each player and ensuring a proper deal (without the benefit of knowing the dice roll value). As described above with reference to FIG. 5, in normal operation, the appearance of any valid tile on one of player spots 54 marks the transition from shuffle mode 44 to deal mode 46. This location of the valid tile is the "action." Once any other tile is detected on a neighboring one of player spots 54, the woodpile 52 data (e.g., cell data shown in FIG. 6) can be used to define the four tiles assigned to each player. Any inconsistencies in this pattern triggers a "Bad Deal" alarm. Ideally, all eight sets of four tiles are read, and the system then transitions from deal mode 46 to play mode 48. An illegal deal is one in which one or more stacks of tiles are dealt out of sequence. A method of identifying an illegal deal is a four-step process that entails determining the woodpile stack dealt first (the "action" spot of player spots 54), determining whether the adjacent stack in woodpile 52 was dealt to the left or to the right of the "action" (determines whether the deal sequence is left-to-right or right-to-left), creating a truth table that assigns all the tiles in woodpile 52 to their respective player spots 54, and validating the truth table against what was actually dealt and highlighting any anomalies.

Figure 7:
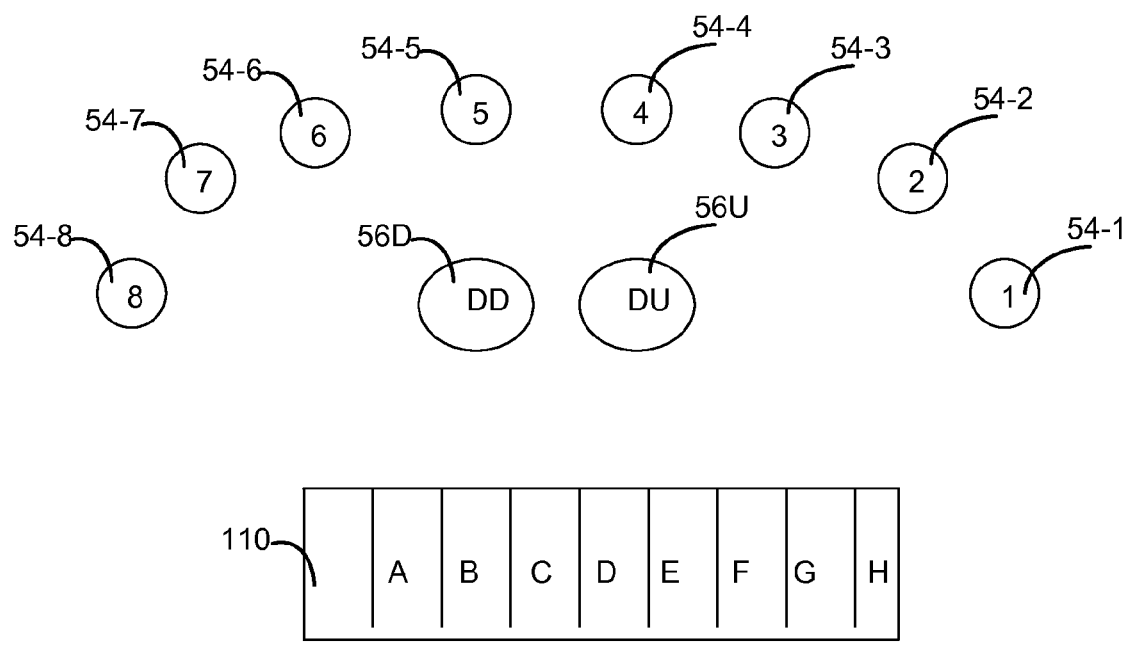
FIG. 7 shows gaming table layout conventions used in constructing a legal deal truth table.
Figure 8:
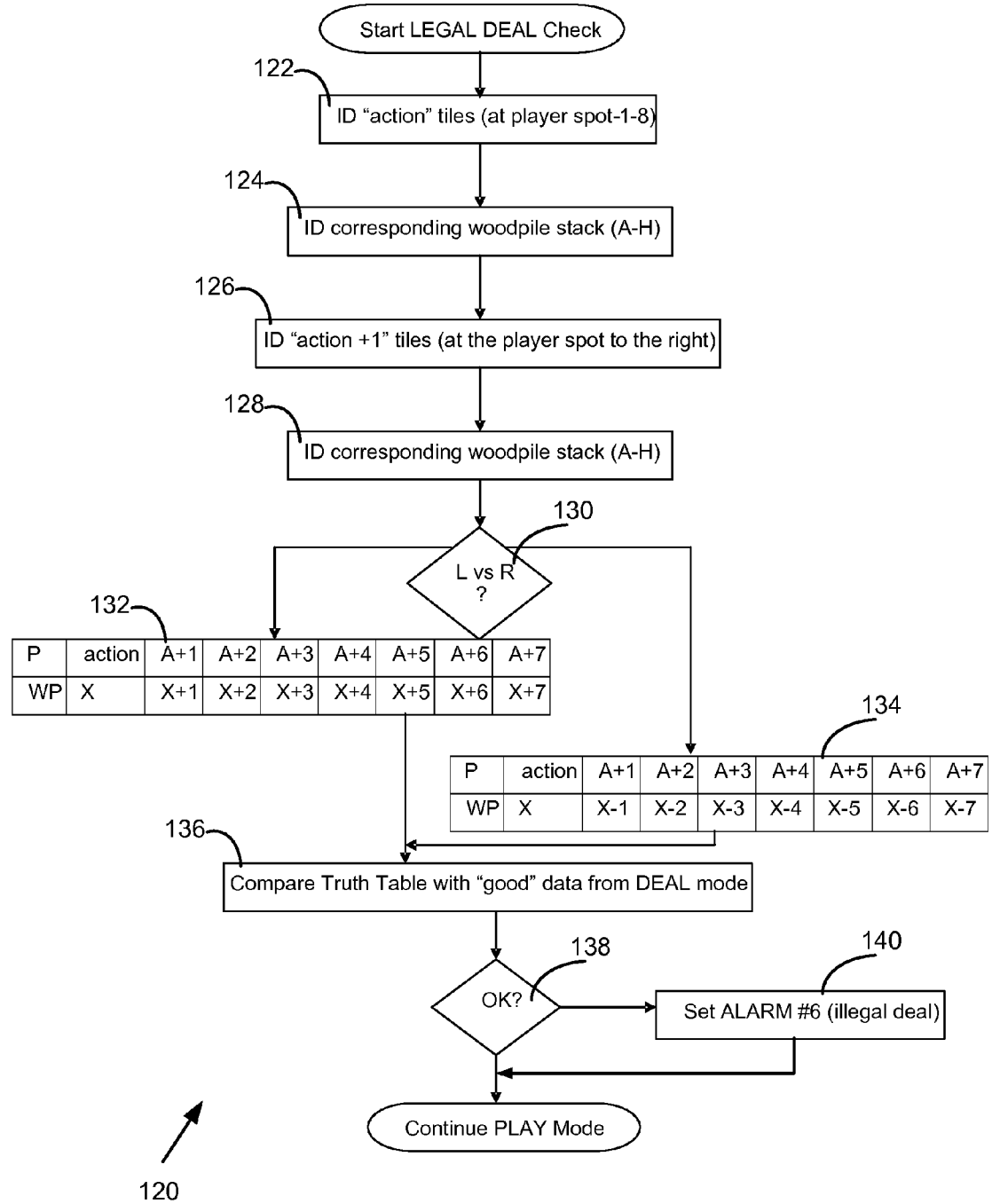
FIG. 8 is a flow diagram outlining the logic steps performed to construct and validate the legal deal truth table of FIG. 7.

FIG. 7 shows the gaming table layout conventions used in constructing the legal deal truth table, and FIG. 8 is a flow diagram outlining the logic steps performed to construct and validate the legal deal truth table. The truth table used to identify illegal deals is constructed using the following rules: (1) only existing data previously collected during shuffle mode 44 (the "post-shuffle woodpile") and deal mode 46 are used and (2) only "good" data are used to generate and validate the truth table. One or both of "suspect" and missing data that are identified in deal mode 44 and agree with the truth table do not raise an alarm.

With reference to FIG. 7, a single row block 110 divided into eight column spaces identified by the letters A, B, C, D, E, F, G, and H represents four-tile woodpile stacks established for distribution to the eight player spots identified by 54-1, 54-2, 54-3, 54-4, 54-5, 54-6, 54-7, and 54-8. Dealer tile spot 56D for "face down" tiles and dealer tile spot 56U for "face up" tiles appear between player spots 54 and single row block 110. Truth table validation is performed as follows with reference to FIG. 8. A legal deal check 120 entails first detecting the deal sequence (left-to-right or right-to-left). This is done by performing an action tiles identification 122 and a corresponding four-tile woodpile stack identification 124 for a deal of four tiles to the first of the eight player spots 54 and thereafter an action tiles identification 126 and a corresponding four-tile woodpile stack identification 128 for the next succeeding deal of four tiles to the second of the eight player spots 54. The first two player spot locations identified indicate the deal sequence, as indicated by a decision block 130. The identifications of the four-tile woodpile stacks distributed to the corresponding player spots 54 populate the one of truth tables 132 and 134 corresponding to the detected one of, respectively, the left-to-right and right-to-left deal sequences. A comparison 136 of the contents of the populated one of truth tables 132 and 134 with the "good" woodpile 52 data of post-shuffle woodpile snapshot 88 of FIG. 6 provides to a decision block 138 a result that causes either an Alarm No. 6 condition 140 indicating an illegal deal or a continuation of play mode 48.

In the event that not all 32 tiles are detected in deal mode 46 (e.g., sloppy deal or faulty tile), the system requires a gracious way to ensure that it does not "hang up" indefinitely. To prevent a faulty tile from crippling game tracking, the system uses timeouts to transition from deal mode 46 to play mode 48. In a preferred embodiment, these timeouts are adjustable with the following defaults: 1) T1 timeout: 4 seconds of no new tiles once the first tile has been dealt to one of player spots 54; and 2) T2 timeout: 1 second (5 read cycles) after detecting at least one tile on each player spot. The purpose of the T1 timeout window is to ensure deal continuity. Data not collected within the T1 timeout window are considered "missing" and their cells are given a yellow highlight. The purpose of the T2 timeout window is to read the RFID number of each tile at a time when it is placed on a player spot and before a player has a chance to substitute a different tile or exchange the tile for a tile assigned to another player spot. Data collected within the T2 timeout windows are considered "good" and their cells are given a green highlight. Data collected after the T2 timeout are considered "suspect" and their cells are given a yellow highlight.

Figure 9:
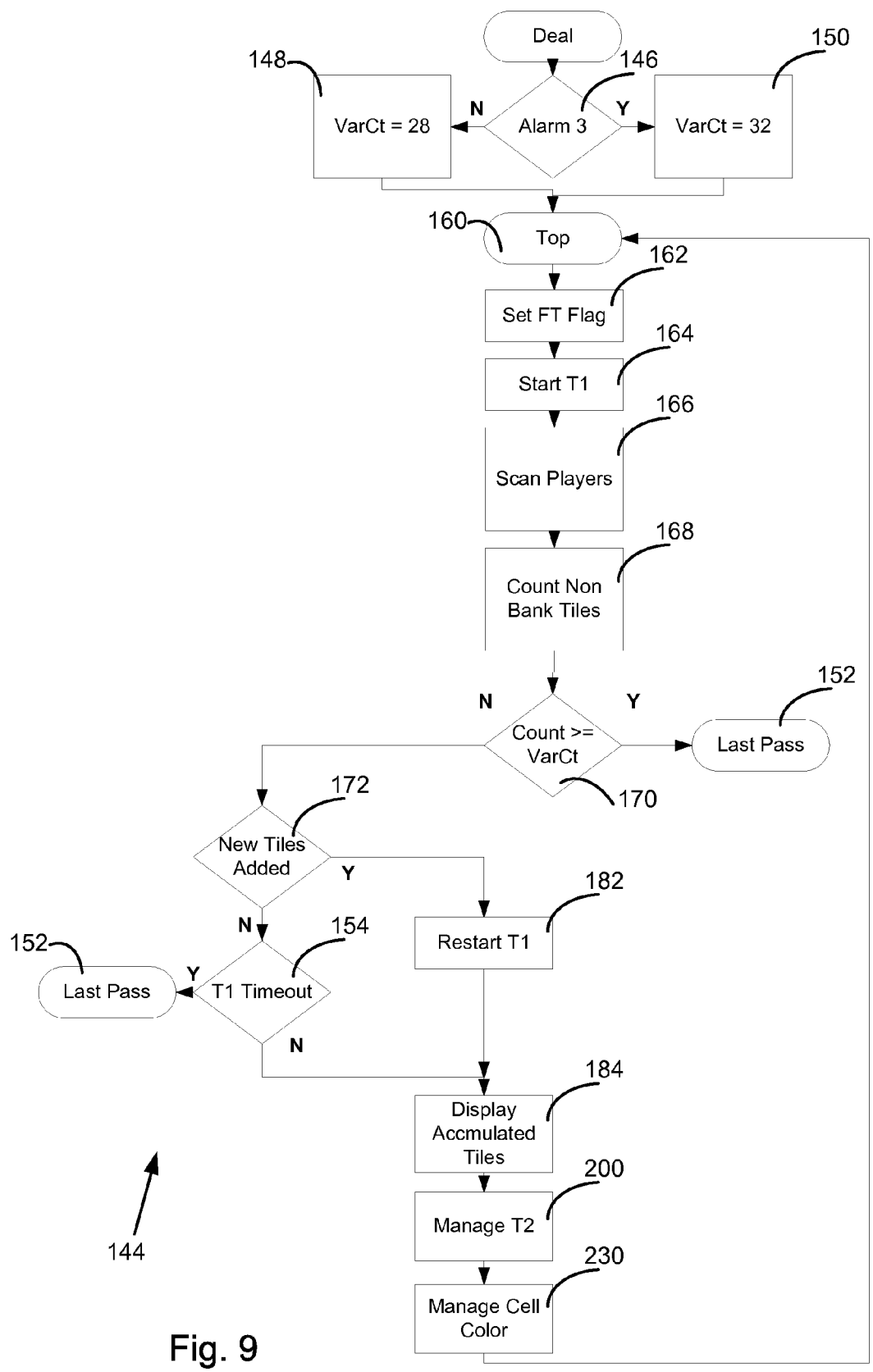
FIG. 9 is a flow diagram of deal mode operations carried out in response to various events arising during a deal mode performed by the system applications program.
Figure 10A:
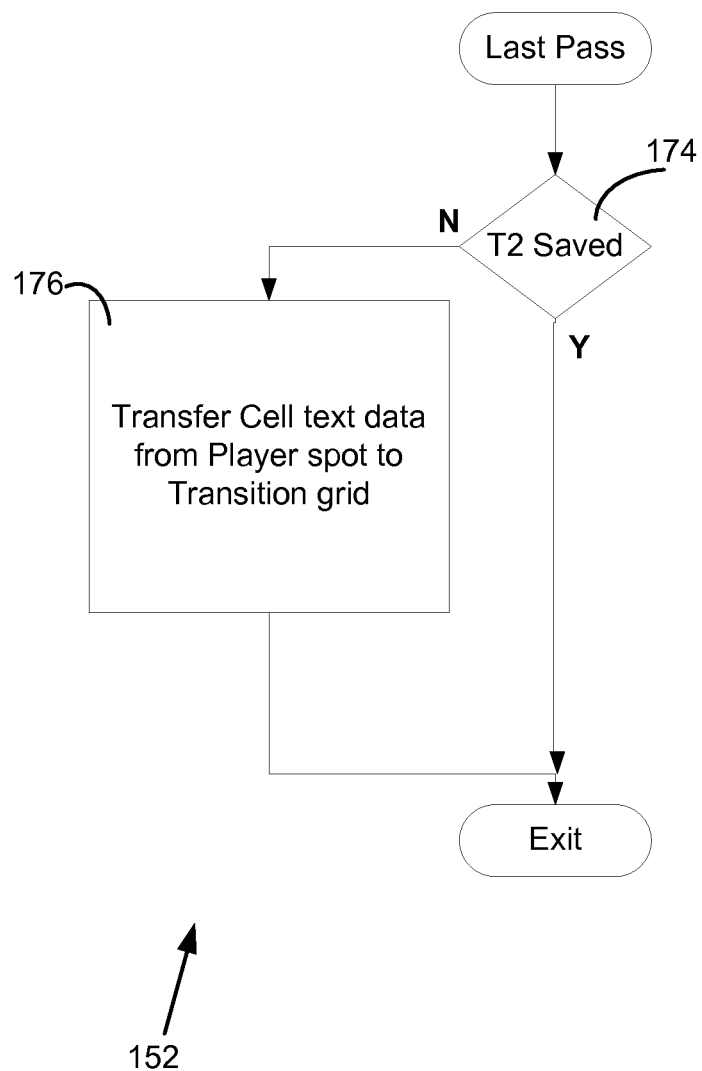
FIGS. 10A, 10B, and 10C are flow charts of, respectively, a last pass subroutine, a T2 timeout window management subroutine, and a managed cell color subroutine performed in response to different events arising during the deal mode outlined in FIG. 9.
Figure 10B:
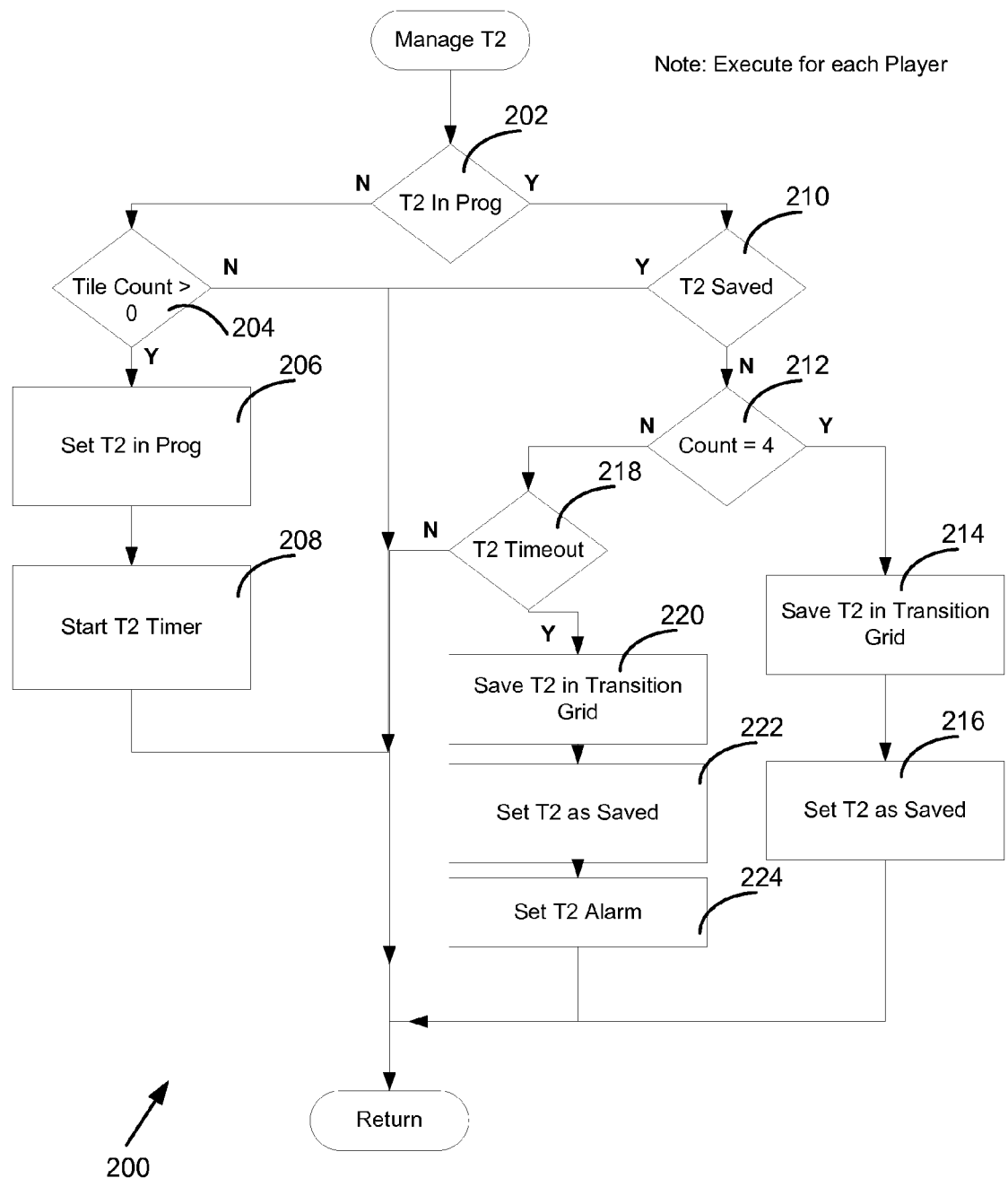
Figure 10C:
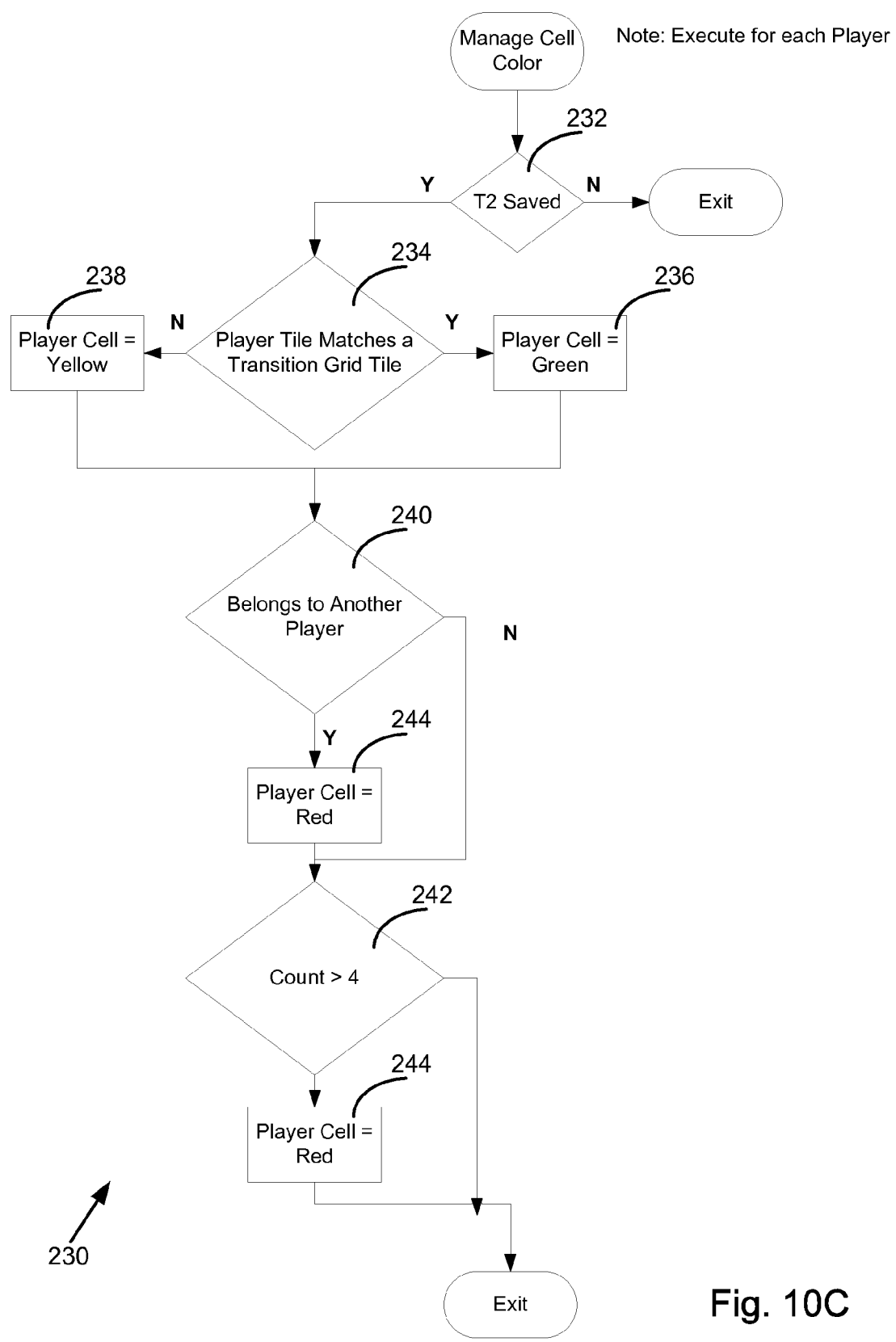
Figure 11:
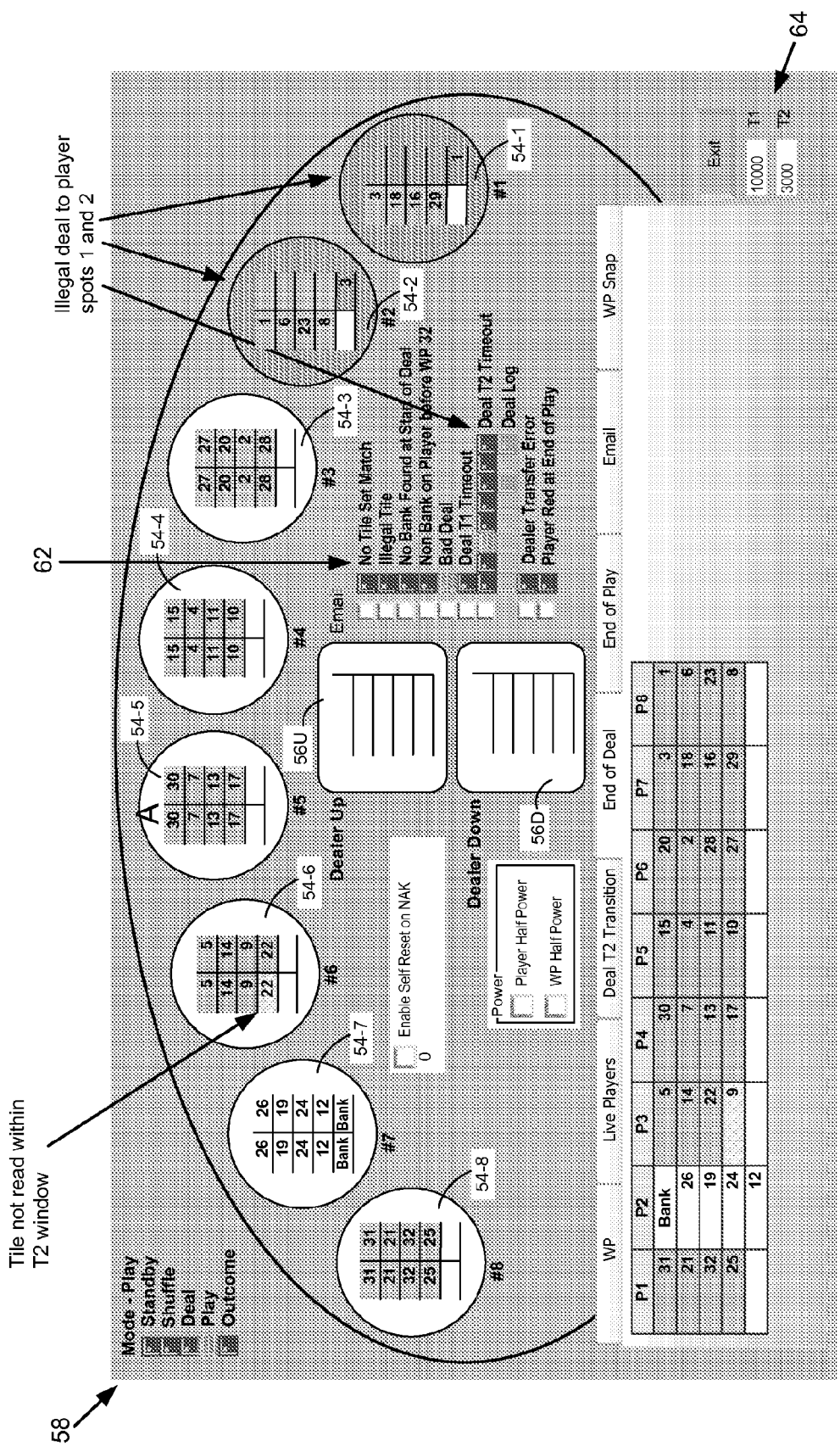
FIG. 11 is a display screen-shot of game play information arranged as shown in FIG. 3 but presented for an end of the deal mode outlined in FIG. 9.

FIG. 9 is a flow diagram showing deal mode operations 144 carried out in response to various events arising during deal mode 46. FIGS. 10A, 10B, and 10C are flow charts of subroutines performed in response to different events arising during deal mode 46 as outlined in FIG. 9. FIG. 11 is a display screen-shot of game play information presented for the end of deal mode 46, just before its transition to play mode 48. With reference to FIG. 9, an Alarm No. 3 determination 146 sets the number of tiles needed to play a game, specifically 32 tiles needed when there is no bank tile in play and 28 tiles needed when there is a bank tile in play. Determination 146 of whether an Alarm No. 3 exists sets to 28 the value of a variable count 148, in the event of no Alarm No. 3 condition, and to 32 the value of a variable count 150, in the event of an Alarm No. 3 condition. Variable counts 148 and 150 set the number of non-bank tiles that need to be exceeded to execute a last pass subroutine 152. Last pass subroutine 152 is also executed when there is a determination 154 of a failure to meet a T1 timeout window constraint. Last pass subroutine 152 is executed for each of player spots 54 and is described below with reference to FIG. 10A. Upon setting of a variable count value of either 28 or 32, deal mode 46 begins at a top position 160 that produces a start flag set 162 and a T1 timeout time window start 164. A player scan 166 and a non-bank tiles count process 168 are performed during T1 timeout window 164. The result of a comparison of a count total produced by tiles count process 168 and a variable count value of either 28 or 32 set by determination 146 drives a decision 170 whether to proceed with last pass subroutine 152 in the event the count total equals or exceeds the set variable count value or to perform a determination 172 of whether new tiles were added in the event the count total is less than the set variable count value.

FIG. 10A is a flow diagram of last pass subroutine 152, which is executed for each one of player spots 54 when the result of decision 170 is that the non-bank tiles count value is equal to or greater than the set variable count value or when the result of decision 154 is that the T1 timeout window constraint was not met. With reference to FIG. 10A, when there is a determination 174 that a T2 timeout window constraint is met, the tile data collected for a given player are considered good and stored in system memory, and exit from execution of subroutine 152 takes place. When there is a determination 174 that a T2 timeout window constraint is not met, the tile data collected after the T2 timeout are considered suspect and the tile data populating the player spot internal memory sites are transferred 176 to a transition grid, which is a screen shot of the eight player spots grid cells displayed under the Deal T2 Transition tab when it is selected. The Deal T2 Transition tab is shown in FIGS. 6 and 11. After tile data transfer 176, exit from execution of subroutine 152 takes place.

With reference again to FIG. 9, when the result of decision 170 is that the non-bank tiles count is less than the set variable count value, new tiles added cause one of two operations to take place. A determination 172 that no new tile was added and determination 154 that the T1 timeout window constraint is met causes execution of last pass subroutine 152 of FIG. 10A. A determination 172 that a new tile was added causes a restart 182 of T1 timeout window. Last pass subroutine 152 executed by operation of either non-bank tiles count decision 170 or determination 154 of a failure to meet the T1 timeout window constraint causes a display 184 of accumulated tiles and execution of a T2 timeout window management subroutine 200.

FIG. 10B is a flow diagram of T2 timeout window management subroutine 200, which is executed for each active one of player spots 54. With reference to FIG. 10B, when there is a determination 202 that a T2 timeout window is not in progress, a determination 204 that there is a non-zero tile count causes (1) setting in progress 206 a T2 timeout window, (2) setting a T2 timer start 208, and (3) returning to deal mode operations 150. When there is a determination 202 that a T2 timeout window is in progress, a determination 210 of whether a T2 timeout window constraint has been met is performed. An affirmative result of determination 210 causes a return to deal mode operations 144 after storage in system memory of RFID numbers of the tiles counted in the player spot 54 under examination. These RFID numbers are displayed upon selection of the Deal T2 Transition tab. A negative result of determination 210 causes a tile count determination 212 for the nominal four-tile woodpile stack of the player spot 54 under examination. A tile count determination 212 resulting in four tiles counted causes a T2 transition grid save process 214 of storing the RFID numbers of the four tiles, a setting of a T2 saved acknowledgment 216, ending of subroutine 200, and returning to deal mode operations 144. A tile count determination resulting in other than four tiles counted causes a determination 218 of whether a T2 timeout constraint has been met for the player spot 54 under examination. A negative result of determination 218 indicates a failure to meet the T2 timeout window constraint and thereby ends subroutine 200 and returns to deal mode operations 144. An affirmative result of determination 218 indicates absence of a nominal four-tile woodpile stack and causes a T2 transition grid save process 222 of storing the RFID numbers of the tiles counted, a setting of a saved acknowledgment 224, ending of subroutine 200, and returning to deal mode operations 144.

An end of execution of subroutine 200 and a subsequent return to deal mode operations 144 start a manage cell color subroutine 230. FIG. 10C is a flow diagram of manage cell color subroutine 230, which is executed for each active one of player spots 54.

With reference to FIG. 10C, a determination 232 that there is no stored T2 saved acknowledgment 216 or 222, the absence of which indicates data collection did not take place within T2 timeout window constraint, ends execution of subroutine 230 and returns to deal mode operations 144. A determination 232 that a T2 saved acknowledgment 216 or 222 is stored causes subroutine 230 to proceed to a player tile and transition grid match determination 234. An affirmative result of determination 234 indicates tile RFID data collected are considered good and produces for display a green player cell indication 236. A negative result of determination 234 indicates tile RFID data collected are considered suspect (i.e., the four tiles in the woodpile stack are not the same as those previously recorded) and produces for display a yellow player cell indication 238.

A determination 240 that a tile previously recorded as belonging to another player or a tile count determination 242 of greater than four tiles in a player spot 54 under examination produces for display a red player cell indication 244, ends execution of subroutine 230, and returns to deal mode operations 144.

FIG. 11 is an example display screen-shot taken at the end of deal mode 46. FIG. 11 is a more fully populated version of the gaming table visual layout of FIG. 6 to show woodpile 52 data presented in response to selection of the End of Deal tab. FIG. 11 shows mode indicator 58 with a "Play" square illuminated in red and a "Mode—Play" column heading. (Although indicator 58 shows "Play," the screen-shot reflects a state of game play at the end of deal mode 46. This demonstrates that selection of tab-actuated display screens is independent of the mode of game play operation 40. Tab selections can be worked back and forth among the seven available tabs, irrespective of game play mode.) The following description points out several noteworthy aspects of the display information presented in FIG. 11.

The bank tile resides on player spot 54-7, the location where RFID Nos. 26, 19, 24, and 12 player tiles reside on player spot 54-7 of woodpile 52 shown in FIG. 6. The player tiles on the other player spots 54 are offset by two player spot positions in the clockwise direction, relative to bank tile player spot 54-7, as dictated by a modulo eight dice roll. An example of modulo eight for two die is dice roll value of two or ten, and an example of modulo eight for three die is dice roll value of ten or eighteen. The "action" (i.e., starting) position is noted by "A" at player spot 54-5.

Figure 13:
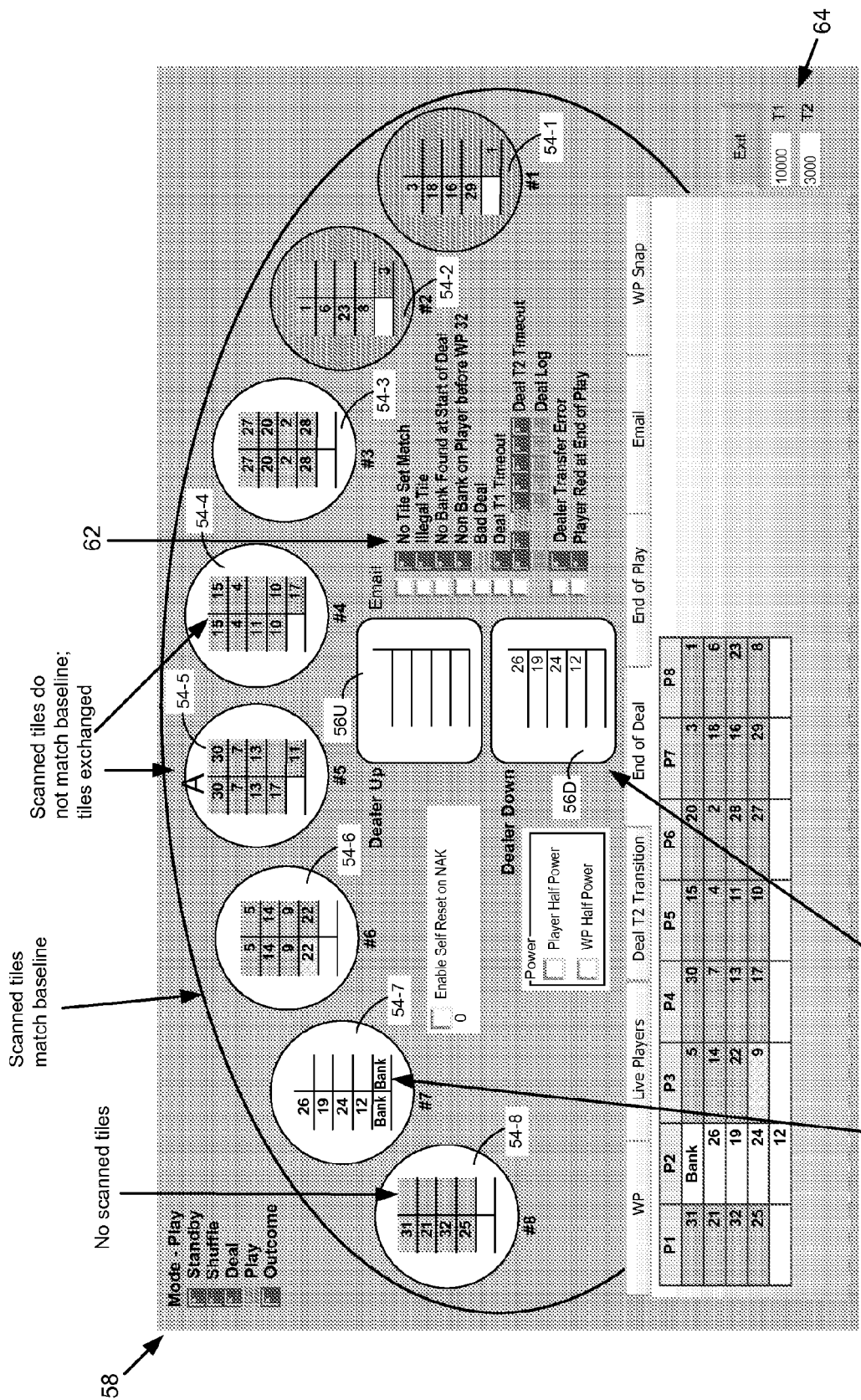
FIG. 13 is a display screen-shot of game play information arranged as shown in FIG. 3 but presented as a typical situation arising during the play mode outlined in FIG. 12.

Each one of player spots 54 is depicted with left side and right side column positions, each including four cells reserved for assigned player tiles (i.e., tiles dealt to the associated one of player spots 54). The left side column positions represent baseline cells containing the RFID numbers of tiles as dealt. The right side column positions represent current, i.e., real time player's hand cells containing the RFID numbers of the tiles located on player spots 54. The numbers appearing in the baseline cells should correspond to the RFID numbers of the four tiles in a woodpile stack assigned to the associated one of player spots 54. The rendering of player spots 54 includes additional four tile cells in each of the left side and right side column positions. Similarly, the rendering of the players grid includes four additional tile cells in each of the P columns. These four additional tile cells are allocated for improperly dealt tiles. They are accessible in the system program, but only one of the four additional cells is displayed. This is shown in FIG. 11 for player spots 54-7, 54-2, and 54-1 and column P2; FIG. 13 for player spots 54-7, 54-5, 54-4, 54-2, and 54-1 and column P2; and FIG. 15 for player spots 54-7, 54-5, 54-4, 54-2, and 54-1 and columns P2, P4, P5, P7, and P8. At the transition from shuffle mode 44 to deal mode 46, the eight P columns of woodpile grid 52 are populated with RFID numbers that represent the four tiles in each of the woodpile stacks that are to be distributed to their corresponding player spots 54.

A tile not read within the T2 timeout window during deal mode 46 is indicated by highlighting in yellow the RFID No. 22 tile baseline cell of player spot 54-6 and the bottommost cell of player spot 54-6 in the End of Deal grid (FIG. 10C, process block 238). The P3 square in the Deal T2 timeout alarm indicator 62 is illuminated in red.

An illegal deal caused by a misdeal of RFID Nos. 1 and 3 tiles to unassigned player spots 54-2 and 54-1 is indicated by highlighting in red the background portions of the circular depictions of player spots 54-2 and 54-1 and illuminating in red the Bad Deal square of alarm indicator 62 (FIG. 10C, process block 244). The RFID Nos. 3 and 1 tiles appearing in red highlight in the otherwise blank player's hand cells of the respective player spots 54-2 and 54-1 identify the unassigned tile in each of them.

Tiles correctly read within the T2 timeout window are indicated by highlighting in green the tile RFID numbers displayed in the tile cells of player spots 54-5, 54-4, and 54-3 (FIG. 100, process block 236). The tile RFID numbers are the same in corresponding baseline cells and player's hand cells. The eight squares in the Deal Log alarm indicator 62 is illuminated in green to indicate a proper deal.

After all tiles have been dealt and arranged in four-tile stacks in each one of player spots 54 or the T1 timeout window elapsed, deal mode operations 144 end and play mode 48 starts. Play mode 48 entails scanning the eight player spots 54 and the two dealer spots to monitor game play and capturing the state of the game at the instant the dealer exposes his hand. Play mode 48 scans both player spots 54 and dealer tile spots 56D and 56U in real time to display the actual presence of tiles in their "correct" assigned locations, the absence of any missing tiles caused by players removing their tiles from the gaming surface—typically to examine and form their HI and LO hands, and an alarm caused by any incorrect tile appearing on dealer tile spots 56D and 56U or player spots 54 where the tiles do not belong.

Figure 12:
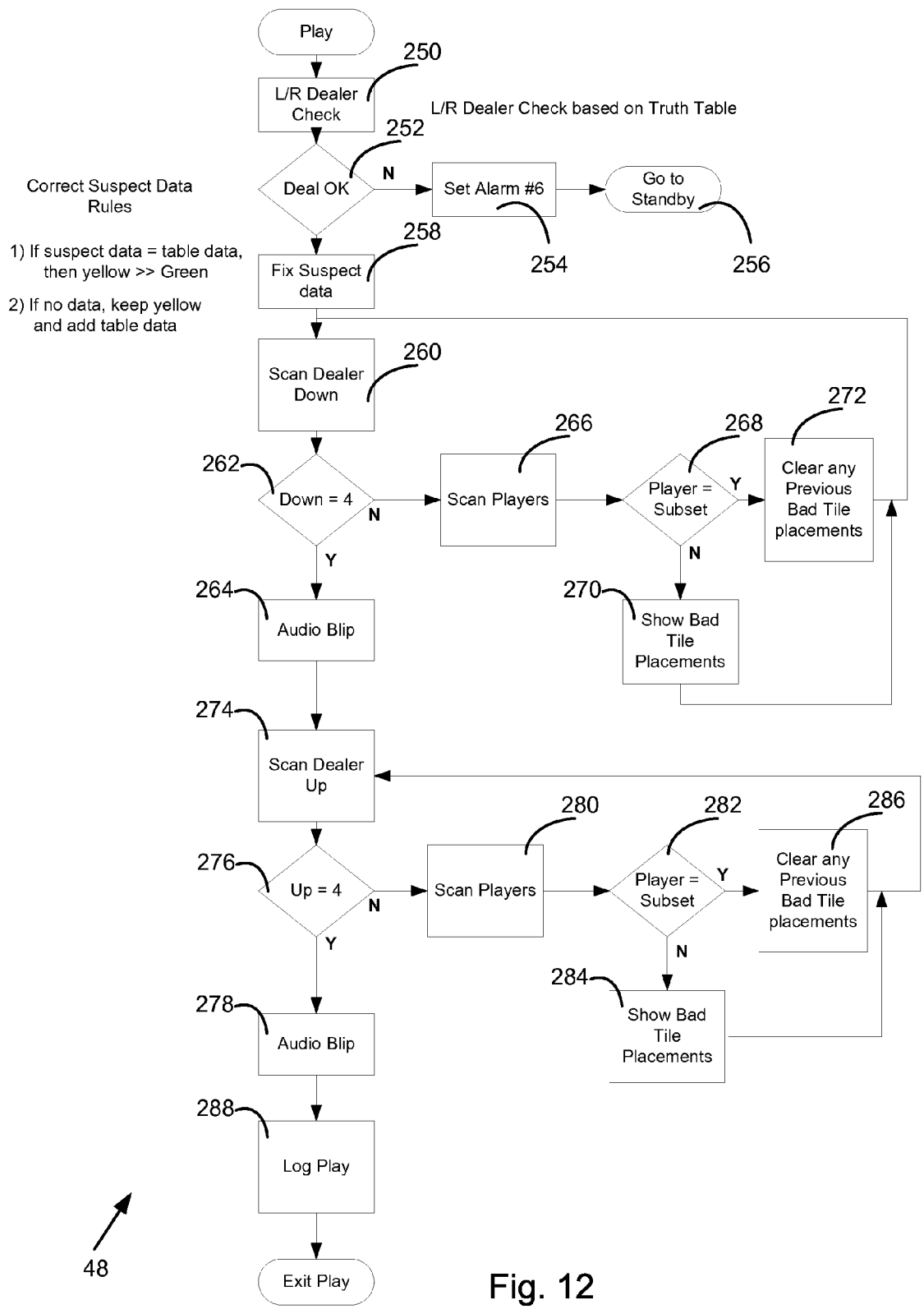
FIG. 12 is a flow diagram of a play mode of operation performed by the system applications program.

Because of the chaotic nature of Pai Gow, and the desire to make the RFID-enabled tile tracking transparent to the players, it is possible for players to inadvertently trigger an alarm by passing tiles in a manner that they are temporarily read by one or more antennas. These alarms will be displayed any time a tile is detected in an inappropriate spot but will self-correct if or when these tiles are later removed and passed on. All of these data are logged in a manner that can be time synchronized to overhead cameras. Before turning of the dealer tiles face up, the dealer will remove tiles from any inactive player spots (i.e., player spots without players present) and will ensure that the four-tile players hands are properly aligned with the defined player spots (and the underlying antennas). Play mode 48 ends the instant the dealer moves four tiles from dealer face down tile spot 56D to dealer face up tile spot 56U. At this time, all players should have formed their HI and LO hands. Any alarms present at this transition are logged, and player spots without tiles are tagged as having no player. FIG. 12 is a flow diagram showing play mode operation 48, and FIG. 13 is a typical screen-shot taken during play mode 48.

With reference to FIG. 12, play mode 48 begins with a L/R deal sequence check 250, which is based on the applicable one of truth tables 132 and 134 shown in FIG. 8. An improper deal sequence determination 252 sets an Alarm No. 6, as indicated by process block 254, and produces a system standby condition 256 or permits resumption of game play. A proper deal sequence determination 252 invokes a suspect data correction rules application 258. A first rule of data correction rules application 258 relates to a condition in which a suspect tile RFID number (highlighted in yellow) in a baseline cell matches that in a corresponding player's hand cell of the assigned one of player spots 54. The system responds to this condition by changing from yellow to green highlight the previously deemed suspect tile cell. A second rule of data correction rules application 258 relates to a condition in which there is no tile RFID number written to a baseline cell highlighted in yellow but there is a tile RFID number written to a corresponding player's hand cell of the assigned one of player spots 54. An example of how this condition could arise is the dealer inadvertently causing one of the tiles in a four-tile stack distributed to one of player spots 54 to tumble outside of the player spot area during player scan 166 and not be read within the T2 timeout window. When the dealer returns the dislodged tile to restore the four-tile stack before transition from deal mode 46 to play mode 48, a subsequent scan reads the previously dislodged tile. The system responds to this condition by maintaining the yellow highlighting of and writing into the baseline cell the tile RFID number in the player's hand cell.

Upon completion of data correction rules application 258, the system performs a scan 260 of dealer face down tiles spot 56D. An affirmative dealer tiles face down count determination 262 indicates with an optional audio blip 264 the expected dealer placement of four tiles on dealer tiles spot 56D. A negative dealer tiles face down count determination 262 indicates that the precondition for four dealer face down tiles on dealer tiles spot 56D has not been met, and the system continues with a scan 266 of player spots 54 to locate the four dealer face down tiles. A player tile determination 268 checks the present tile placement against a previous tile placement and either shows bad tile placements 270 or clears any previous bad tile placements 272. (Either of the showing or correcting bad tile placements processes can be carried out with automatic highlighting the tile grid cells because the system has previously stored at deal mode 46 the RFID numbers of the four face down tiles.) After showing or correcting bad tile placements, scan 260 of dealer face down tiles spot 56D is repeated. Upon determination 262 that there presently exists the expanded placement of four tiles on dealer tiles spot 56D, the system produces optional audio blip 264 and performs scan 274 of dealer face up tiles spot 56U. An affirmative dealer tiles face up count determination 276 indicates with an optional audio blip 278 the expected dealer placement of four tiles on dealer tiles spot 56U. A negative dealer tiles face up count determination 276 indicates an anomalous dealer placement of a number of other than four tiles on dealer tiles spot 56U and initiates a scan 280 of player spots 54 to identify the RFID numbers of the tiles placed on them. A player tile determination 282 checks the present tile placement against a previous tile placement and either shows bad tile placements 284 or clears any previous bad tile placements 286. After showing or correcting bad tile placements in a manner analogous to that described above for processes 270 and 272, scan 274 of dealer face up tiles spot 56U is repeated. Upon determination 276 that there presently exists the expected placement of four tiles on dealer tiles spot 56U, the system produces optional audio blip 278, records a game play log 288, and proceeds to outcome mode 50.

FIG. 13 is an example screen-shot taken during play mode 48. FIG. 13 shows the same game play conditions as those shown in FIG. 11, except for empty player's hand cells (i.e., no scanned tiles) on player spot 54-8, exchanged tiles between player spots 54-5 and 54-4, and transfer of the bank tiles to dealer face down tiles spot 56D and illegally dealt tiles to player spots 54-2 and 54-1. The absence of scanned tiles in the player's hand cells of player spot 54-8 indicates that the player has removed the tiles from the gaming table to inspect them. This is permissible activity during play mode 48. The RFID No. 11 tile does not match any of the baseline RFID tile numbers in the baseline cells on player spot 54-5, and the RFID No. 17 tile does not match any of the baseline RFID tile numbers in the baseline cells on player spot 54-4. Inspection of the RFID numbers of the baseline cell tiles on player spots 54-5 and 54-4 reveals that RFID Nos. 11 and 17 tiles were exchanged. RFID Nos. 11 and 17 tiles are indicated as belonging to other players by highlighting in red and placement in a cell position below the player's hand cells. The absence of scanned tiles in the player's hand cells of player spot 54-7 is expected because these tiles are bank tiles located on dealer face down tiles spot 56D. The transfer of bank tiles from player spot 54-7 to dealer face down tiles spot 56D can take place when one of the players elects to function as the bank for a given game. The absence of scanned tiles in the assigned cells of the player's hands of player locations 54-2 and 54-1, the presence of tile RFID No. 3 highlighted in red in player location 54-2, and the presence of tile RFID No. 1 highlighted in red in player location 54-1 indicate illegal deals to player locations 54-2 and 54-1. The tile RFID numbers of the remaining three tiles in each of the illegal deals are not displayed but are stored in system memory.

Outcome mode 50 identifies the active players and ensures that each active player is using only assigned tiles. As noted earlier, the tiles are removed from player spots 54 without players during play mode 48. Players are not permitted to handle their tiles from the time after play mode 48 to the time after the dealer moves the dealer tiles to face up tiles spot 58U. When the dealer tiles are moved from face down tiles spot 56D to face up tiles spot 56U, any player spots 54 with no tiles are assumed to be inactive. An alarm is not set if the system correctly reads all four of the assigned tiles on each active player spot 54. An alarm will be set if either an unassigned tile appears on a player spot (players exchanging tiles) or fewer than four assigned tiles appear on a player spot (players substituting tiles). Any illegal deal is also displayed. "Suspect" tiles (those tiles captured after the T2 timeout window) but which continue to agree with the assigned four-tile stack from the woodpile do not trigger an alarm.

If players are sloppy and do not correctly place their tiles in the designated spots, the dealer has the opportunity to finesse the tiles before moving the dealer tiles from face down tiles spot 56D to face up tiles spot 56U. The outcome continues to be displayed until the dealer removes all tiles from the player and dealer spots. Removing tiles triggers the end of game and transitions the system from outcome mode 50 to a standby mode.

Figure 14:
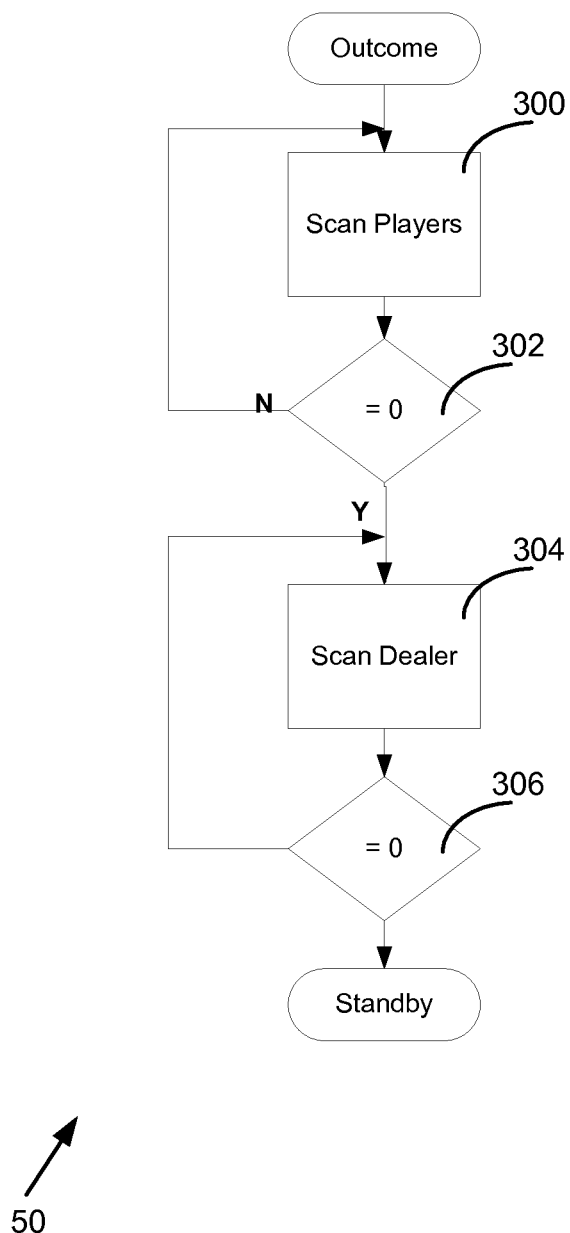
FIG. 14 is a flow diagram of an outcome mode of operation performed by the system applications program.

FIG. 14 is a flow diagram of outcome mode 50. With reference to FIG. 14, a player scan 300 and player spots count determination 332 are performed until no player tiles are positioned in player spots 54. Upon a zero player spot count determination 302, a dealer scan 304 and a dealer spot count determination 306 are performed until no dealer tiles are positioned in dealer tiles spots 56D and 56U. A zero dealer tiles spot count determination 306 transitions the game to a standby condition.

Figure 15:
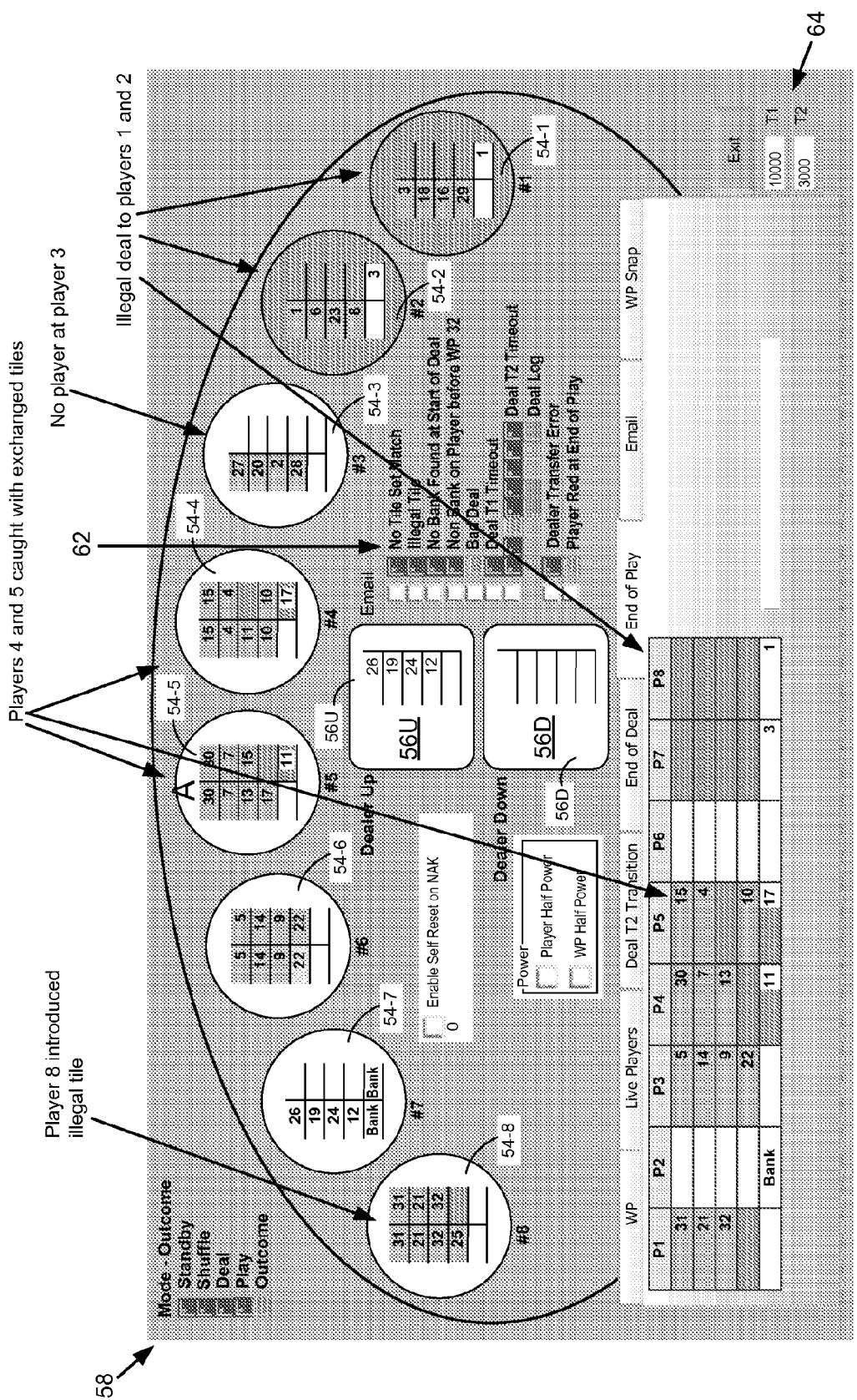
FIG. 15 is a display screen-shot of the game play information arranged as shown in FIG. 3 but presented for a situation arising at the end of the outcome mode outlined in FIG. 14.

FIG. 15 is a screen-shot of outcome mode 50. With reference to FIG. 15, the "Outcome" square of mode indicator 58 is illuminated in red, and the "Mode=Outcome" column heading is presented. Player spot 54-8 shows an empty player's hand cell that is highlighted in red. This condition indicates that the player at player spot 54-8 introduced an illegal tile. Player spot 54-6 shows a baseline cell highlighted in yellow but an agreement between RFID tile numbers of corresponding baseline cells and player's hand cells. This condition arose by a failure to meet a T2 timeout window constraint, as indicated by the red illumination of the P3 square of the Deal T2 Timeout alarm indicator 62. Player spots 54-5 and 54-4 each show an empty player's hand cell illuminated in red and in a cell position below the player's hand cells the RFID number of an exchanged tile (i.e., RFID No. 11 tile for player spot 54-5 and RFID No. 17 tile for player spot 54-4). Player spot 54-3 shows empty player's hand cells with no highlighting, indicating no player participating at player spot 54-3. Player spots 54-2 and 54-1 show all player's hand cells empty and highlighted in red, together with the background of the circular player spots highlighted in red. This condition results from an illegal deal to players at player spots 54-2 and 54-1, as indicated by the red illumination of the Bad Deal square of alarm indicator 62.

The play tile grid presented by selection of the End of Play tab shows with red highlighting the player's hand cells identified as representing an illegal tile (P1), exchanged tiles (P4 and P5), and illegal deals (P1 and P2). Because of the agreement between the baseline and player's hand cells of player spot 54-6, all cells in P3 are presented with green highlight (removing yellow highlight of RFID No. 22 tile).

Figure 16:
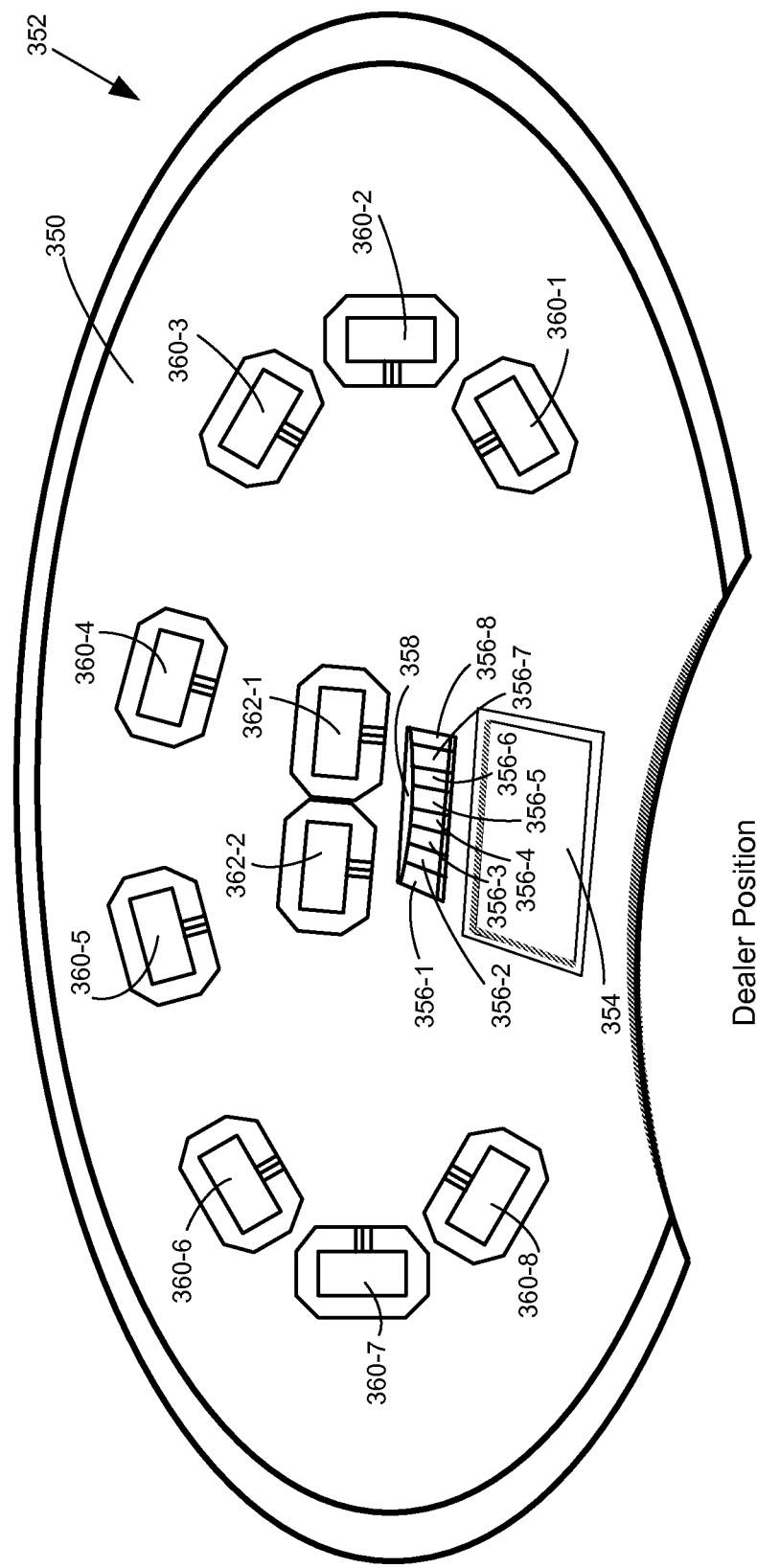
FIG. 16 is a diagram showing a perspective view of a playing surface of a Pai Gow gaming table with its foam pad or felt surface cover removed.

FIG. 16 is a diagram showing a perspective view of a playing surface 350 of a Pai Gow gaming table 352 with its foam pad or felt surface cover removed. With reference to FIG. 16, playing surface 350 includes a chip tray 354 and three sets of antennas. The first antenna set includes a linear array of eight mutually adjacent woodpile antennas 356-1, 356-2, 356-3, 356-4, 356-5, 356-6, 356-7, and 356-8 (collectively, woodpile reader antennas 356) that are located at a woodpile position or spot 358 and correspond to respectively, players P1, P2, P3, P4, P5, P6, P7, and P8 identified in the display screen-shots shown in FIGS. 3, 6, 11, 13, and 15 and described above. The second antenna set includes eight player position reader antennas 360-1, 360-2, 360-3, 360-4, 360-5, 360-6, 360-7, and 360-8 (collectively, player reader antennas 360), one each located at, respectively, player spots 54-1, 54-2, 54-3, 54-4, 54-5, 54-6, 54-7, and 54-8. The third antenna set includes two dealer position antennas 362-1 and 362-2 (collectively, dealer position antennas 362) located at, respectively, face down dealer spot 56D and face up dealer spot 56U.

Figure 17:
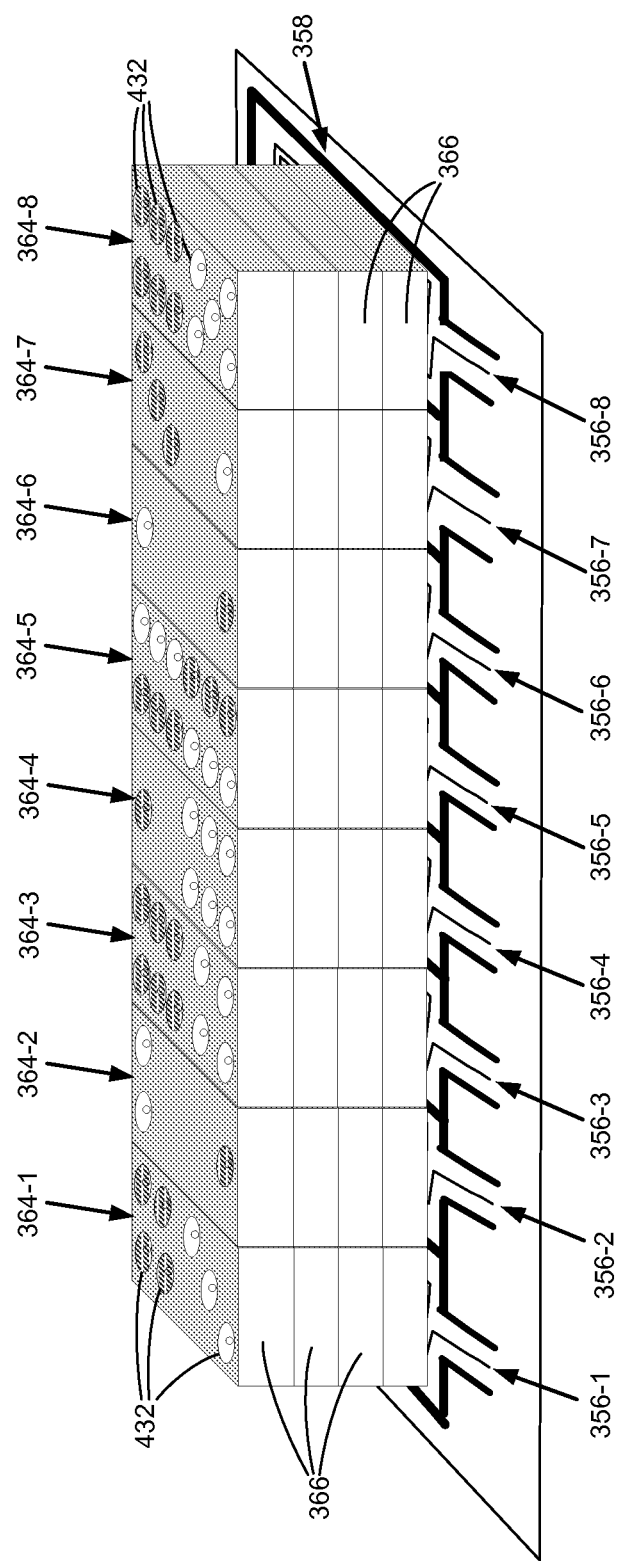
FIG. 17 is a diagram of eight four-tile stacks of gaming tiles shown side-by-side, as they would be arranged in a woodpile at a woodpile spot and placed over and in spatial alignment with woodpile antennas on the gaming table of FIG. 16 at the end of the shuffle mode of FIG. 5.

FIG. 17 is a diagram of eight four-tile stacks 364-1, 364-2, 364-3, 364-4, 364-5, 364-6, 364-7, and 364-8 (collectively, tile stacks 364) of gaming tiles 366. Tile stacks 364 are shown side-by-side as they would be arranged in woodpile 52 at woodpile spot 358 and placed over and in spatial alignment with, respectively, woodpile antennas 356-1, 356-2, 356-3, 356-4, 356-5, 356-6, 356-7, and 356-8 at the end of shuffle mode 44 during game play. Each gaming tile 366 contains a machine-readable tile identifying tag, preferably an RFID tag, that is encompassed by a shield loop, as will be described in detail later.

The function of woodpile reader antennas 356 is to identify in woodpile 52 eight tile stacks 364 of four Pai Gow gaming tiles each. Woodpile 52 presents for RFID tracking two challenges that entail knowing which gaming tiles 366 are present and in which tile stack 364 each of them is located.

The first challenge stems from the tendency of RFID tags to couple with one another when they are proximally located. Such coupling causes RFID read errors. Woodpile reader antennas 356 are configured to achieve a balance among antenna tuning, antenna power output, and read range to ensure that the four gaming tiles in an associated one of tile stacks 364 can be read consistently.

The second challenge is addressed by minimizing crosstalk and maximizing discrimination between adjacent tile stacks 364. Woodpile reader antennas 356, different ones of which are associated with tile stacks 364 in woodpile 52, are used to maximize their sensitivities to the gaming tiles 366 with which the associated wood pile reader antennas 356 are spatially aligned and minimize the sensitivity to tiles of which nearby tile stacks 364 are formed. Ideally, only tags in a single tile stack 364 spatially aligned with a specific woodpile reader antenna 356 receive sufficient excitation energy to "light up." If tags of gaming tiles 366 in adjacent tile stacks 364 are also energized, signal strength is the parameter used to differentiate signals from the "correct" tile stack 364 from signals from a "wrong" tile stack 364. This is accomplished by steering the magnetic field flux generated by one of the reader antennas in the array of woodpile reader antennas 356 toward tags of gaming tiles 366 in tile stack 364 to which the one of the reader antennas is spatially aligned and away from tags of gaming tiles 366 in neighboring tile stacks 364.

Figure 18:
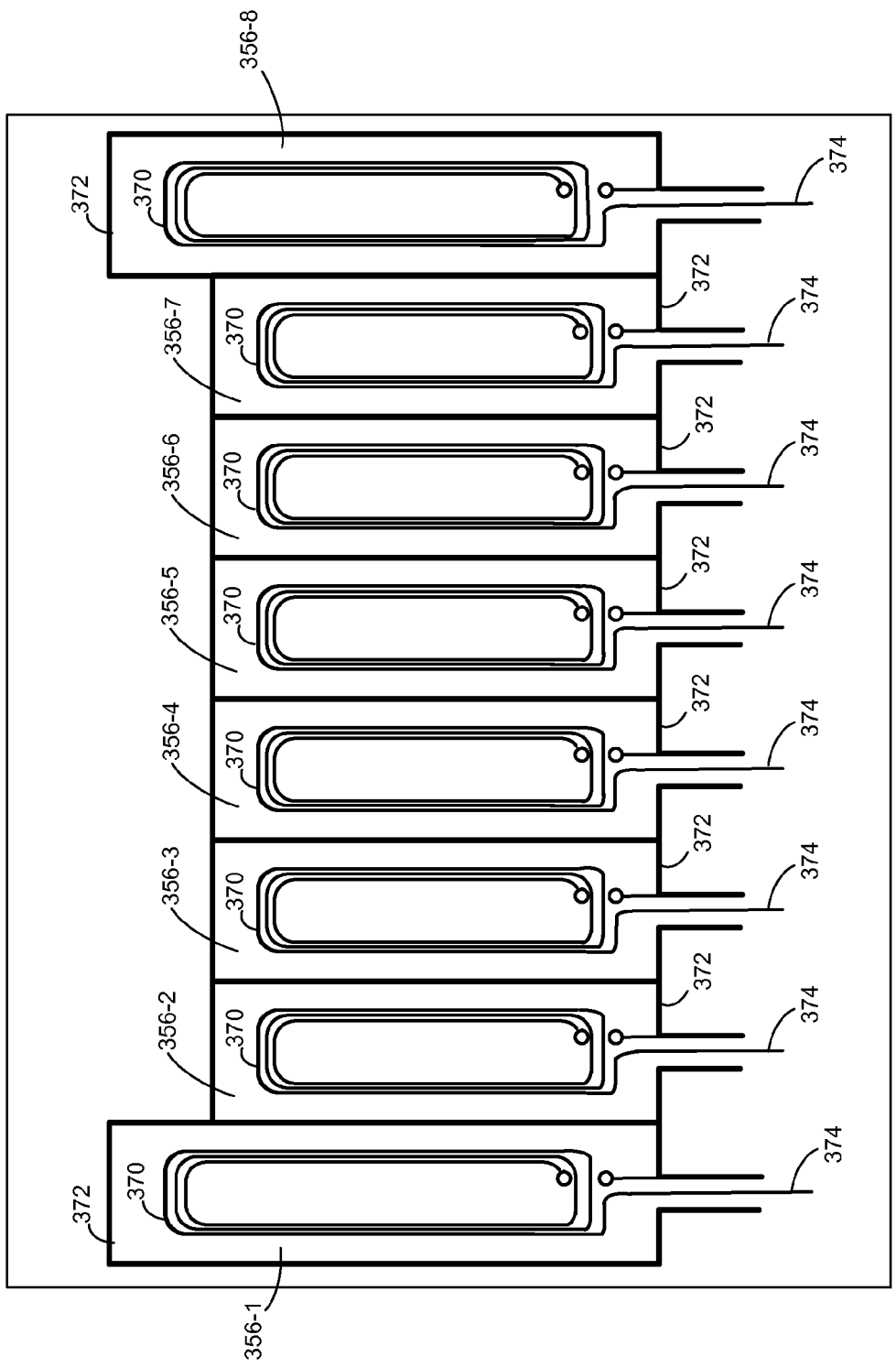
FIG. 18 is a diagram showing the eight woodpile antennas installed on the gaming table of FIG. 16.

FIG. 18 is a diagram of woodpile antenna array 356. Each of woodpile antennas 356-1, 356-2, 356-3, 356-4, 356-5, 356-6, 356-7, and 356-8 is an electrical conductor formed in a spiral pattern 370 of three rectangular loops and is shielded by a ground loop 372. Woodpile antennas 356-1 and 356-8 on each end of the array of woodpile reader antennas 356 are longer than the six interior antennas in the array of woodpile reader antennas 356. The added lengths of woodpile antennas 356-1 and 356-8 accommodate the facet of the Pai Gow tile ritual shuffle that entails selection of "deal from the LEFT" or "deal from the RIGHT" deal sequence decision 130 (FIG. 8). The outermost loop terminates in an SMA connector (not shown), to which a reader signal 374 applies excitation energy to "light up" gaming tiles 366 placed over and aligned with the reader antenna. A preferred source of reader signal 374 is a TRF7960/61 Multi-Standard Fully Integrated 13.56 MHz Radio Frequency Identification (RFID) Analog Front End and Data Framing Reader System, available from Texas Instruments Incorporated, Dallas, Tex. The TRF7960/61 is an integrated analog front end and data framing system of a 13.56 MHz RFID reader system. Shield loop 372 is placed around each of the eight woodpile reader antennas 356 such that all of the tiles in a tile stack 364 can be read and the signal strength can be used to differentiate these tiles from the tiles in neighboring gaming tile stacks 364.

Figure 19A:
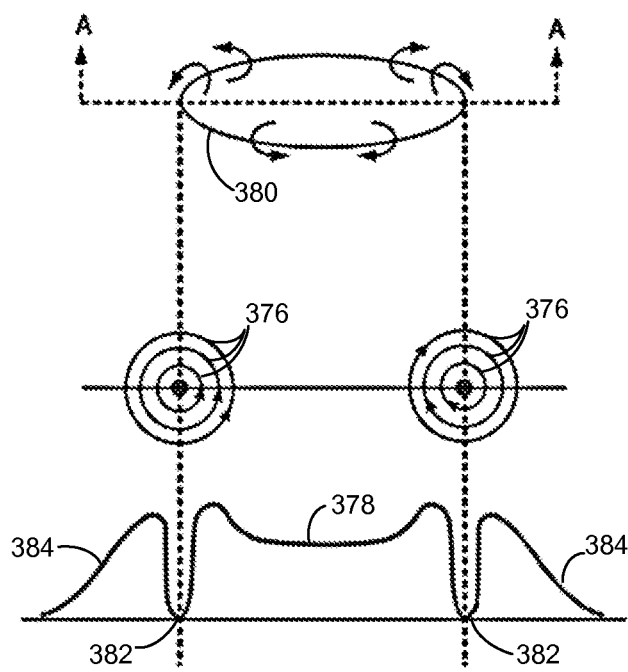
FIGS. 19A and 19B are diagrams of a loop antenna juxtaposed with graphs of magnetic field flux lines and field strengths of the loop antenna when it is, respectively, unshielded and shielded by a ground loop.
Figure 19B:
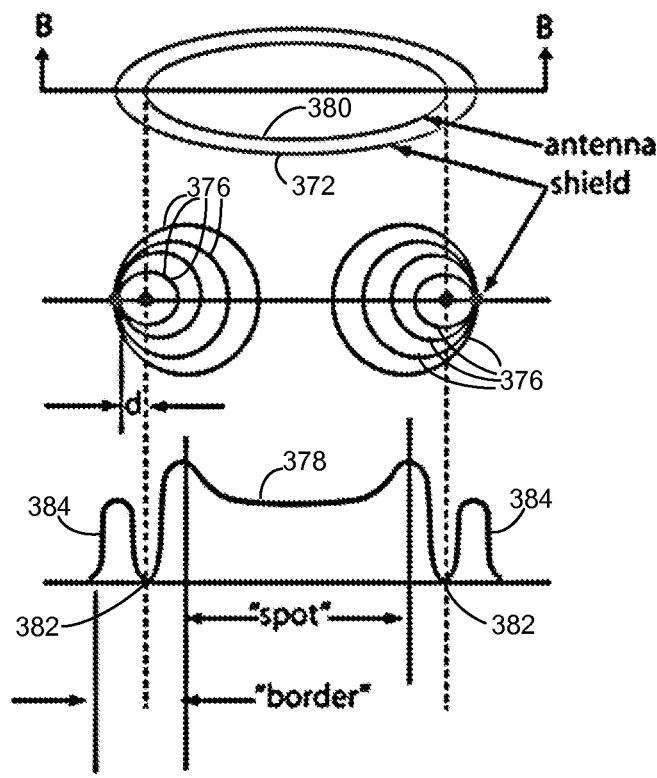

The operation of shield loop 372 can be explained with reference to FIGS. 19A and 19B. FIG. 19A shows magnetic field flux lines 376 and field strength 378 for a typical loop antenna 380. A null 382 is a region of low sensitivity arising from horizontal magnetic field flux lines in the H-field that does not intersect the antenna loop of a passive tag. A tail 384 is a region of undesirable sensitivity and contributes to crosstalk between adjacent antennas. FIG. 19B shows how shield loop 370 tunes the location of null 382 and constrains the shape of tail 384. A gap, d, between the outermost loop (depicted as loop antenna 380 in FIG. 19B) of the individual reader antenna 370 and shield loop 372 truncates tail 384 as shown, but the gap, d, has positive and negative attributes. A positive attribute is that a smaller gap results in a tighter border around the betting zone of woodpile 52 at woodpile spot 358 and reduces crosstalk. A negative attribute is that a smaller gap will also cause the H-field to collapse, thereby reducing overall sensitivity and eliminating the height of the tile stack that can be reliably read.

As to sensitivity to alignment, woodpile 52 can be moved ⅜ in. (9.5 mm) off of and away from playing surface 350 with modest degradation in signal and no read errors. A horizontal offset distance (sideways along the array of woodpile reader antennas 356) greater than ⅜ in. (9.5 mm) will likely introduce read errors. Woodpile 52 can be misaligned by as much as 5/16 in. (7.9 mm) relative to the array of woodpile reader antennas 356 with modest degradation in signal and no errors. Horizontal misalignment greater than 5/16 in. (7.9 mm) will likely introduce read errors. A vertical offset distance (woodpile 52 moves away from the array of woodpile reader antennas 356 in direction away from dealer) can be misaligned by as much as ½ in. (12.7 mm) with modest degradation in signal and no read errors. Vertical misalignment greater than ½ in. (12.7 mm) will likely introduce read errors.

Figure 20:
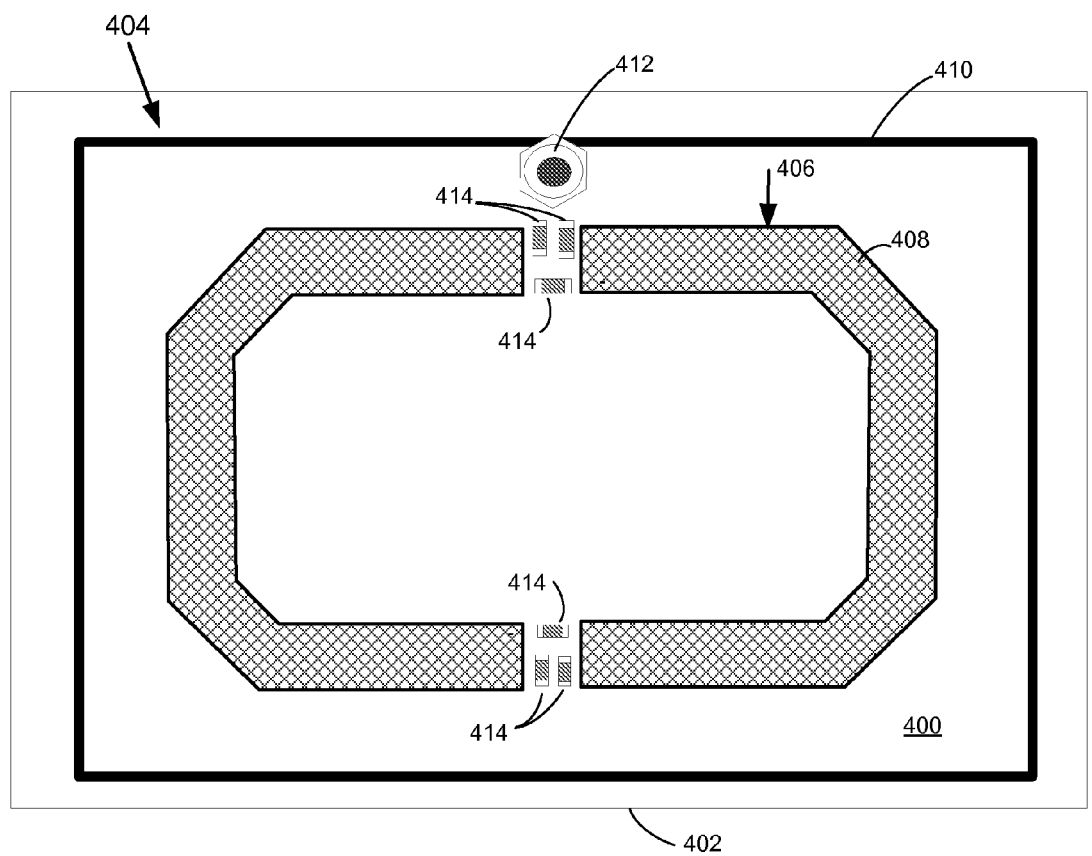
FIG. 20 is a diagram of one of ten rectangular ring antennas constituting eight player reader antennas and two dealer position antennas mounted to the playing surface of the gaming table of FIG. 16.

FIG. 20 is a diagram showing a bottom surface 400 of a thin printed circuit board 402 on which a rectangular ring antenna 404 is formed. Ten ring antennas 404 are mounted to playing surface 352 of gaming table 350 and constitute the eight player reader antennas 360 and the two dealer position antennas 362. Each ring antenna 404 is composed of an annular patterned mesh 406 of electrical conductors 408 encompassed by a rectangular electrically conductive shield 410. An SMA connector 412 that is vertically mounted to bottom surface 400 for RF interconnection to the source of reader signal 374 depends downwardly through a hole (not shown) in playing surface 352 after printed circuit board 402 is mounted to gaming table 350. Two sets of surface mounted signal frequency tuning components 414 are electrically connected to annular mesh 406. The use of thin printed circuit boards 402 and vertical mounting of RF connector 412 facilitates retrofitting of existing Pai Gow gaming tables.

Figure 21:
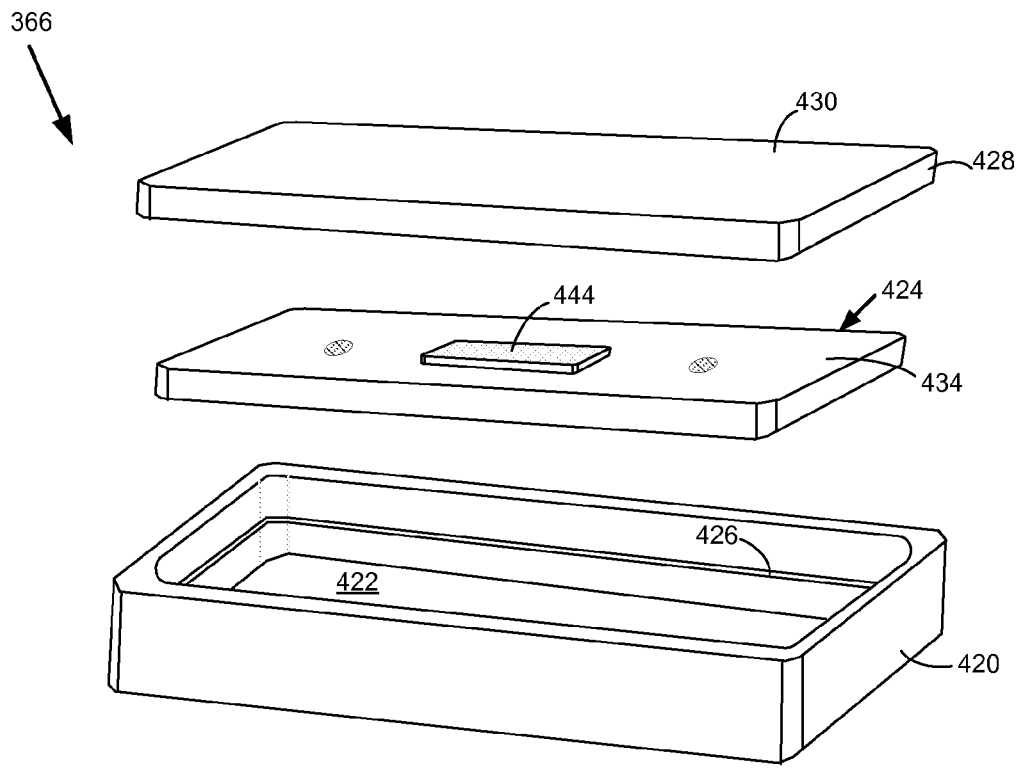
FIGS. 21 and 22A are, respectively, exploded and cross-sectional views of one preferred embodiment of a gaming tile of FIG. 17.
Figure 22A:
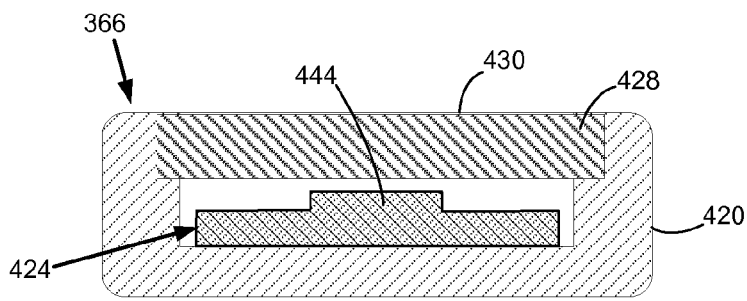
Figure 23:
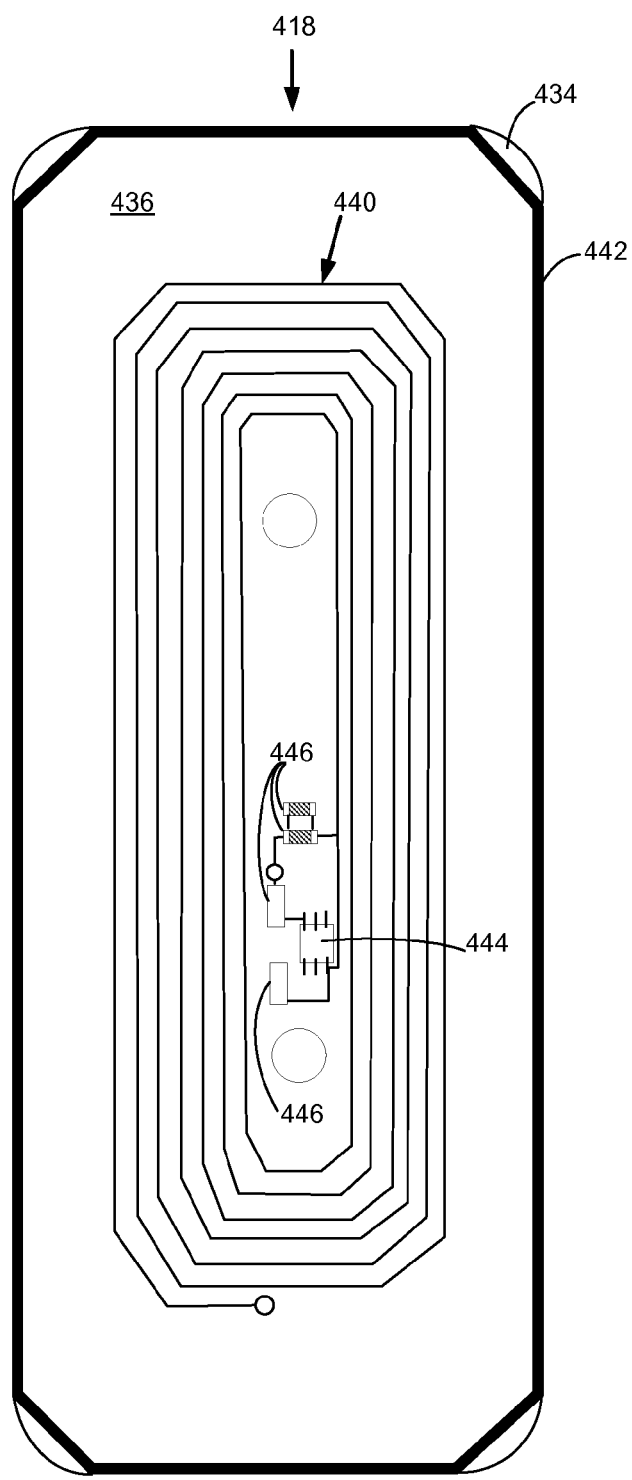
FIG. 23 is a top plan view of a gaming tile antenna installed in the disclosed preferred embodiments of the gaming tile.

Three preferred embodiments of gaming tile 366 are constructed as described below. FIGS. 21 and 22A are, respectively, exploded and cross-sectional views of a first preferred embodiment of gaming tile 366. FIG. 23 is a top plan view of a gaming tile antenna 418 installed in each of the three preferred embodiments of gaming tile 366. With reference to FIGS. 21, 22A, and 23, the first embodiment of gaming tile 366 is composed of an open topped, hollow tile body 420 having a floor 422 on which a printed circuit board assembly (PCBA) 424 is mounted and an interior shoulder 426 on which a removable tile lid 428 rests. Tile body 420 and tile lid 428 are made of thermoset resins, such as Bakelite, urea, and poly(methyl methacrylate) (PMMA), which afford gaming tile 366 with hardness and scratch resistance properties. Tile lid 428 is sealed to tile body 420 by a conventional adhesive, leaving a void inside tile body 420 and exposing an outer surface 430 on which the red and white dimples or "pips" 432 (shown in FIG. 17) appear.

Figure 22B:
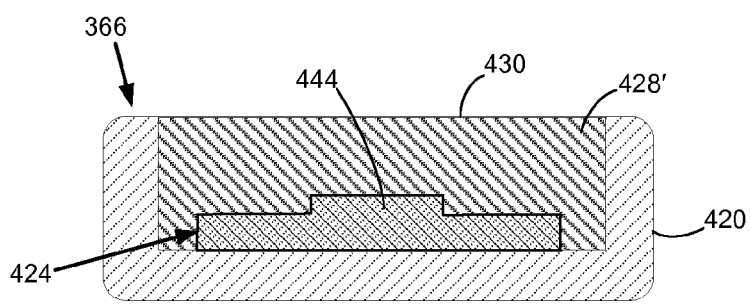
FIG. 22B is a cross-sectional view of an alternative preferred embodiment of a gaming tile of FIG. 17.

FIG. 22B is a cross-sectional view of a second preferred embodiment of gaming tile 366. The second embodiment differs from the first embodiment in that tile lid 428 is replaced by potting material 428' that fills the void in tile body 420 to produce gaming tile 366 in a monolithic form. Gaming tile 366 in monolithic form may be fabricated by molding tile body 420 to oversized dimensions and thereafter trimming its width and length to final dimensions; performing a routing process to impart to tile body 420 a hollow void having a depth that is defined by floor 422; placing PCBA 424 on floor 424; and filling the void with a casting resin. Subjecting the resin-filled tile body 420 to a grinding operation sets its height and final dimensions. Polishing and machining gaming tile 366 to smooth its edges allow for machining and manual painting of the pips on outer surface 430.

A third preferred embodiment is designed for medium-to-high volume production and resembles the first embodiment shown in FIGS. 21 and 22A. The exceptions are that tile body 420 is fabricated as a molded body to final dimensions, including the internal void and external corner and side margin radii, and tile lid 428 is molded with the pips formed on outer surface 430. The pips are colored by automated screen printing, and tile lid 428 is bonded to tile body 420 by robotic application of conventional adhesive. PCBA 424 can be a rigid FR-4 board or custom flexible Mylar RFID inlay.

With particular reference to FIG. 23, PCBA 424 includes a rigid printed circuit board 434 of industry standard FR-4 type having a surface 436 on which tile antenna 418 is formed. Tile antenna 418 is an electrical conductor formed in a spiral pattern 440 of seven rectangular loops with beveled corners and is shielded by a ground loop 442. The innermost loop terminates in an SMT mounted RFID tag integrated circuit 444. A preferred RFID tag circuit 444 is a RI-I03-114A-01 Tag-it™ HF-I Standard Transponder Inlays Miniature Rectangle, which operates in conjunction with the TRF7960/61 reader to implement RFID capability. Tuning capacitors 446 are electrically connected to tile antenna 418 to tune its frequency response to make it compatible with those of woodpile reader antennas 356, player reader antennas 360, and dealer position antennas 362. An alternative to the RFID circuitry populating an FR-4 rigid circuit board is custom RFID integrated circuitry fabricated in a flexible Mylar inlay.

FIG. 24 is a block diagram showing the electronic architecture of a tile reader control and game play monitoring system 460. System 460 is constructed with an interface hub 462 implemented with Power Over Ethernet capability to distribute electrical power to and provide digital connectivity between PC 68 and an electronics system 464. Electronics system 464 includes circuitry to which woodpile reader antennas 356, player reader antennas 360, and dealer position antennas 362 are connected for reading in response to execution of the application system program running on PC 68. The circuitry of the electronics system 464 includes four RFID reader cards 466, 468, 470, and 472, and an RFID dealer card 474. RFID reader cards 466 and 468 and dealer card 474 are operationally connected to a first processor card 476, and RFID reader cards 470 and 472 are operationally connected to a second processor card 478. Two 12 VDC power adapters 480 and 482 provide electrical power to, respectively, processor cards 476 and 478 and their operationally connected reader cards and dealer card, and a third 12 VDC power adapter 484 provides electrical power to interface hub 462. Each of RFID reader cards 466, 468, 470, and 472 and dealer card 474 has two RFID reader systems that provide to associated ones of antennas 356, 360, and 362 reader signals 374 that, in response to commands by PC 68, apply excitation energy to read RFID tags of gaming tiles 366 in the tile stacks 364 spatially aligned with antennas 356, 360, and 362. Processor cards 476 and 478, in response to the application of excitation energy, process RFID tag information obtained from gaming tiles 366 of tile stacks 364 spatially aligned with woodpile reader antennas 356, player reader antennas 360, and dealer position antennas 362. Each of processor cards 476 and 478 presents on its output to interface hub 462 the processed RFID tag information for delivery to PC 68 for data processing in accordance with the system application program.

Woodpile reader antenna pairs 356-1 and 356-5, 356-2 and 356-6, 356-3 and 356-7, and 356-4 and 356-8 are connected to, respectively, RFID reader cards 466, 468, 470, and 472 to minimize crosstalk between adjacent woodpile antennas 356 by staggering the reading of them by two simultaneously applied reader signals 374. The use of four RFID reader cards each driving simultaneously two of the eight woodpile reader antennas 356 and equipped with the preferred RFID reader system components results in a read cycle time of 0.4 second for all of gaming tiles 366 in woodpile 52. Player reader antenna pairs 360-8 and 360-7, 360-6 and 360-5, 360-4 and 360-3, and 360-2 and 360-1 are connected to, respectively, RFID cards 466, 468, 470, and 472. Because player reader antennas 360 are mutually spaced apart by greater distances than those separating adjacent woodpile antennas 356, all eight player reader antennas 360 are read simultaneously. Dealer position antennas 362-1 and 362-2 are connected to dealer card 474.

It will be obvious to those having skill in the art that many changes may be made to the details of the above-described embodiments without departing from the underlying principles of the invention. For example, an alternative implementation substitutes an antenna and a single woodpile position tile tag identification reader for the eight antennas and their associated woodpile position tile tag identification readers. In this alternative implementation, the woodpile position tile tag identification reader reads RFID numbers of all 32 tiles instead of RFID numbers of tiles in eight stacks of four tiles. The tile reader control and game play monitoring system assigns the tiles to each player spot at the start of the deal, instead of recording the tile RFID numbers for the post-shuffle (final) woodpile. The system thereafter checks for tile RFID number consistency at each player spot from the deal to the end of game. The potential downside of this alternative implementation is an absence of cross-checking of tile RFID numbers of the woodpile stacks of four tiles assigned to their associated player spots against the RFID numbers of the tiles present in the player spots. The potential benefit of this alternative implementation is a simpler design of woodpile position antenna with a single tile tag identification reader. The scope of the present invention should, therefore, be determined only by the following claims.

The invention claimed is:

1. A method of real-time tracking of Pai Gow gaming tiles to mitigate risk of dealer or player cheating behavior during game play, comprising:

setting in a gaming environment a Pai Gow gaming table having a playing surface that includes a pre-assigned woodpile position and multiple pre-assigned player positions, the pre-assigned woodpile position in operative association with woodpile position tile tag identification readers, and the pre-assigned player positions in operative association with corresponding player position tile tag identification readers;

providing on the table surface a Pai Gow game set of gaming tiles each of which having a machine-readable tile identifying tag that is readable by the woodpile position and player position tile tag identification readers;

forming in the pre-assigned woodpile position a post-shuffle woodpile of multiple four-tile stacks of the gaming tiles in the Pai Gow game set, the post-shuffle woodpile arranged so that each of the multiple four-tile stacks corresponds to a specified one of the multiple pre-assigned player positions and is associated with a corresponding one of the woodpile position tile tag identification readers;

using the woodpile position tile tag identification readers associated with their corresponding multiple four-tile stacks to read and create a record of the tile identifying tags of the gaming tiles in the multiple four-tile stacks;

distributing the multiple four-tile stacks from the post-shuffle woodpile to the corresponding specified ones of the multiple pre-assigned player positions and using the player position tile tag identification readers associated with their corresponding multiple four-tile stacks to read the tile identifying tags of the gaming tiles distributed; and determining for the distributed multiple four-tile stacks whether there is a difference between the recorded tile identifying tags and the tile identifying tags at the corresponding pre-assigned player positions.

2. The method of claim 1, in which a gaming tile dealing sequence is specified for the distributing of the multiple four-tile stacks, and in which the determining of whether there is a difference between the recorded tile identifying tags and the tile identifying tags includes checking whether the distributing of the multiple four-tile stacks to the specified ones of the multiple pre-assigned player positions was performed in accordance with the specified gaming tile dealing sequence.

3. The method of claim 1, in which the playing surface further includes a pre-assigned dealer position that is divided into a face up dealer spot and a face down dealer spot, the face up and face down dealer spots in operative association with corresponding dealer spot tile tag identification readers, and further comprising distributing a four-tile stack from one of the multiple pre-assigned player positions to the face down dealer spot and thereafter moving the four-tile stack from the face down dealer spot to the face up dealer spot where a dealer reveals high and low values of the four-tile stack for comparison to high and low values of the four-tile stacks present at other ones of the multiple pre-assigned player positions.

4. The method of claim 1, in which the player position tile tag identification readers are configured to read tile identifying tags of multiple ones of the distributed gaming tiles while they are arranged in a stack.

5. The method of claim 1, in which the machine-readable tile identifying tags and woodpile position and player position tile tag identification readers are implemented with radio frequency identification (RFID) capability.

6. The method of claim 5, further comprising multiple antennas associated with the woodpile position and player position tile tag identification readers in the implementation of RFID capability, the antennas mounted to the gaming table and positioned in proximity to the playing surface.

7. The method of claim 6, in which at least one of the antennas is of a spiral type.

8. A Pai Gow gaming table equipped with a system implementing real-time tracking of gaming tiles to mitigate risk of dealer or player cheating behavior during game play, each of the gaming tiles having a machine-readable tile identifying tag, comprising:
- a Pai Gow gaming table having a playing surface that includes a pre-assigned woodpile position and multiple pre-assigned player positions;
- a woodpile position tile tag identification reader configured to read the tile identifying tags of multiple gaming tiles located in the pre-assigned woodpile position;
- multiple player position tile tag identification readers in operative association with the pre-assigned player positions and configured to read tile identifying tags of the gaming tiles located in associated ones of the pre-assigned player positions; and
- a controller in operative association with the woodpile position and player position tile tag identification readers to perform during game play real-time tracking of movement of the gaming tiles between the pre-assigned woodpile position and the pre-assigned player positions and of movement of the gaming tiles between the pre-assigned player positions.

9. The tracking system-equipped gaming table of claim 8, in which the woodpile position tile tag identification reader constitutes one of multiple woodpile position tile tag identification readers that are configured to read the tile identifying tags of multiple gaming tiles arranged in stacks located in the pre-assigned woodpile position and corresponding to different ones of the woodpile position tile tag identification readers.

10. The tracking system-equipped gaming table of claim 9, in which the gaming tiles arranged in stacks located in the pre-assigned woodpile position are members of an array of mutually adjacent gaming tile stacks, and in which the different ones of the woodpile position tile tag identification readers are in spatial alignment with the corresponding ones of the array member gaming tile stacks.

11. The tracking system-equipped gaming table of claim 8, in which the playing surface further includes a pre-assigned dealer position that is divided into a face up dealer spot and a face down dealer spot, the face up and face down dealer spots in operative association with corresponding dealer spot tile tag identification readers, and in which the controller detects movement of a gaming tile stack from one of the multiple pre-assigned player positions to the face down dealer spot and thereafter movement of the gaming tile stack from the face down dealer spot to the face up dealer spot.

12. The tracking system-equipped gaming table of claim 8, in which the player position tile tag identification readers are in operative association with different ones of the pre-assigned player positions, and in which each of the player position tile tag identification readers is configured to read the tile identifying tags of multiple ones of the gaming tiles when they are arranged in a stack.

13. The tracking system-equipped gaming table of claim 8, in which the machine-readable tile identifying tags and woodpile position and player position tile tag identification readers are implemented with radio frequency identification (RFID) capability.

14. The tracking system-equipped gaming table of claim 13, further comprising multiple antennas associated with the woodpile position and player position tile tag identification readers in the implementation of RFID capability, the antennas mounted to the gaming table and positioned in proximity to the playing surface.

15. The tracking system-equipped gaming table of claim 14, in which at least one of the antennas is of a spiral type.

* * * * *